United States Patent
Sewell

(10) Patent No.: US 11,603,710 B2
(45) Date of Patent: Mar. 14, 2023

(54) ALIGNMENT SYSTEM

(71) Applicant: SEWELL POWER TRANSFER PTY LTD, Southport (AU)

(72) Inventor: Samuel John Sewell, Southport (AU)

(73) Assignee: SEWELL POWER TRANSFER PTY LTD, Southport (AU)

( * ) Notice: Subject to any disclaimer, the term of this patent is extended or adjusted under 35 U.S.C. 154(b) by 717 days.

(21) Appl. No.: 16/488,205

(22) PCT Filed: Feb. 26, 2018

(86) PCT No.: PCT/AU2018/050162
§ 371 (c)(1),
(2) Date: Aug. 22, 2019

(87) PCT Pub. No.: WO2018/152588
PCT Pub. Date: Aug. 30, 2018

(65) Prior Publication Data
US 2020/0032591 A1    Jan. 30, 2020

(30) Foreign Application Priority Data

Feb. 27, 2017 (AU) .................................. 2017900646

(51) Int. Cl.
*E21B 12/00* (2006.01)
*E21B 3/02* (2006.01)
*E21B 7/02* (2006.01)

(52) U.S. Cl.
CPC ............... *E21B 12/00* (2013.01); *E21B 3/02* (2013.01); *E21B 7/02* (2013.01)

(58) Field of Classification Search
CPC ............... E21B 12/00; E21B 3/02; E21B 7/02
See application file for complete search history.

(56) References Cited

U.S. PATENT DOCUMENTS

| | | | |
|---|---|---|---|
| 4,338,723 | A | 7/1982 | Benjamin |
| 4,428,125 | A | 1/1984 | West, Jr. |
| 5,014,795 | A | 5/1991 | Gibson |
| 5,673,491 | A | 10/1997 | Brenna et al. |
| 7,200,516 | B1 | 4/2007 | Cowley |

(Continued)

FOREIGN PATENT DOCUMENTS

CN    205184700 U    4/2016

OTHER PUBLICATIONS

Extended European Search Report received in European Application No. 18756540.3 dated Nov. 18, 2020.

(Continued)

*Primary Examiner* — Kristyn A Hall
(74) *Attorney, Agent, or Firm* — Greer, Burns & Crain, Ltd

(57) ABSTRACT

An apparatus for use in maintaining a desired orientation of an implement is provided. The apparatus includes orientation sensing equipment operable to sense the orientation of the implement, and an orientation indicator operable to be mounted relative to the implement, the orientation indicator having a plurality of indication portions, and when the orientation indicator is mounted relative to the implement, the indication portions are positioned so as to be visible from different locations around the implement. In use, when the orientation of the implement deviates from the desired orientation, one or more indication portions provide a visible indication of a direction in which the implement has deviated from the desired orientation.

22 Claims, 11 Drawing Sheets

(56) References Cited

U.S. PATENT DOCUMENTS

2009/0260239 A1    10/2009   Cerwin
2014/0000921 A1     1/2014   Vanko et al.
2015/0187198 A1     7/2015   Silverberg et al.

OTHER PUBLICATIONS

International Search Report for International Patent Application No. PCT/AU2018/050162, dated Apr. 26, 2018.

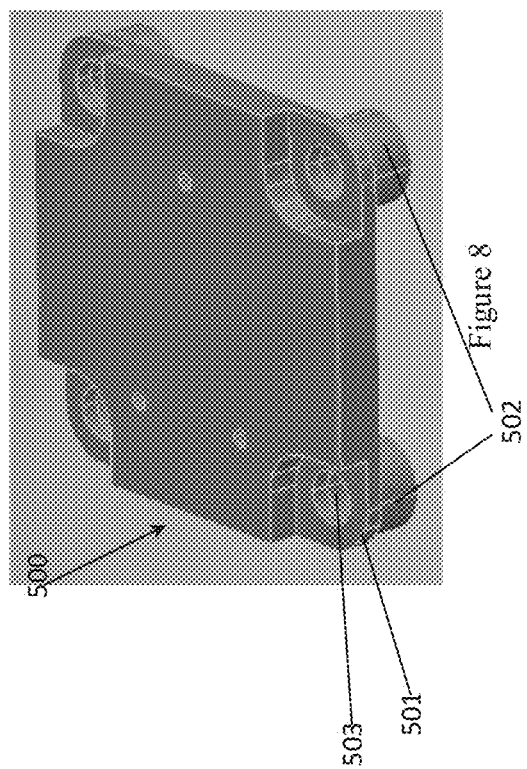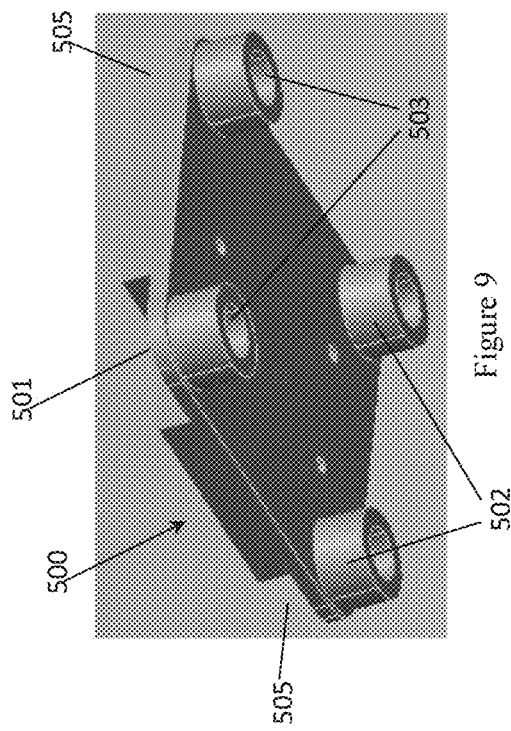

ALIGNMENT SYSTEM

TECHNICAL FIELD

The present invention may find use in connection with, for example, the use of drilling and boring tools such as augers and the like, which are often connected to and operated using an excavator (or at least by some form of excavating equipment). The present invention may also find use or application in connection with, for example, the installation of such things as screw piles (also known as screw anchors or helical anchors) and/or with the formation of such things as augercast piles and the like. Again, the installation or formation of these types of things often involves the use of an excavator. When used in connection with drilling and boring tools such as augers and the like, the present invention may be particularly concerned with helping to ensure these remain correctly oriented during use. When used in connection with the installation of screw piles, or the formation of augercast piles or other similar foundations or structural supports, the invention may be concerned particularly with helping to ensure that these are correctly oriented as they are installed or formed.

Hereafter, the invention will be discussed mainly with reference to one particular example application in which it may find use, namely in connection with the use of augers connected to excavators. However, it is to be clearly understood that that no limitation whatsoever is to be implied simply from the fact that the invention is discussed mainly with reference to its use in this particular application. Indeed, this is merely one application in which the invention may find use, and which has been chosen merely as a convenient example for explaining the invention and the benefits it may provide. Therefore, the invention may also find use in a wide range of other applications, including (but not limited to) those alluded to above. Furthermore, it is quite possible that embodiments of the invention could be made which capable of use in applications that are unrelated to, or which do not involve (in any way) excavators or excavating equipment. As just one possible example of this, embodiments of the invention could be made for helping to ensure the correct orientation/alignment of holes which are drilled with, say, a handheld power drill or the like.

In any case, for the avoidance of doubt, the invention could potentially be used in any application where, say, a hole needs to be drilled, bored or otherwise formed, or where some other kind of elongate foundation, structural support, or the like, needs to be formed/created, and where it is important for the tool used for drilling or boring the hole to be maintained in (or as close as to as can be achieved) a particular orientation as the hole is formed, or where whatever tool or other object is being used in forming or creating the elongate foundation, structural support, etc, this needs too needs to be maintained in (or as close as to as can be achieved) the correct orientation as this is being done.

BACKGROUND

As mentioned above, the present invention will be described primarily with reference to its use in the example application of drilling tools, specifically augers, which are connected to and operated using an excavator.

An auger is a tool used for drilling (or boring) holes. The present discussion will focus primarily on augers used for drilling holes into the earth (or perhaps into or through rock, etc). Augers used for this purpose are often connected to, and operated by, an excavator or some similar piece or form of equipment. FIG. 1 illustrates a typical arrangement where an auger 20 is connected to, and ultimately operated by, an excavator 70.

As shown in FIG. 1 (and this is quite conventional) the auger 20 is connected to the outer end 72 of the boom of the excavator 70. More specifically, the auger 20 is connected on the bottom end (or more specifically to the drive output 42) of a hydraulic motor or "auger drive" 40, and the auger drive 40 is connected on the end 72 of the excavator boom. Actually, in the particular example in FIG. 1, there is an adapter 30 which is connected directly to the end 72 of the excavator boom, and the auger drive 40 is connected to the end 72 of the boom via the adapter 30.

The auger drive 40 is connected ("plumbed") into the hydraulic system of the excavator 70. Hoses/hydraulic fluid lines that carry hydraulic fluid from the excavator 70 (or from its pump, etc) to the auger drive 40, and from the auger drive 40 back to the excavator 70, are visible (but not individually labelled) extending from near the top of the auger drive 40 in FIG. 1. In any case, the excavator hydraulics drive (i.e. they power) the auger drive 40, and the auger drive 40 in turn drives rotation of the auger 20 which, as mentioned above, is connected to the rotating output (or output shaft) 42 of the auger drive 40.

As shown in FIG. 1, the auger 20 has helical "flights" 22 (in this case there are a pair of flights 22) on its lower end. On other augers, there may be a different number of helical flights, and the helical flights may extend a different (often a greater) distance up the length of the auger. In any case, when the auger 20 is driven to rotate by the auger drive 40 (and the auger 20 may often also be pushed downward into the earth, or allowed to drop downwards under it's self-weight, through operation of the excavator boom), it consequently bores into the earth creating a cylindrical hole. Naturally, the depth of the whole is defined by the distance (depth) with which the auger bores into the ground, and the diameter of the hole as defined by the distance which the flights 22 on the auger extend out in a radial direction from the axial centre of the auger. (Basically, the diameter of the bored hole will correspond to the outer planform circular shape defined by the auger flights). As the auger 20 rotates, the screw-like motion of the flights helps to carry displaced earth up and out of the hole. (Note: the direction in which the auger 20 must rotate when drilling/boring down is therefore the direction which causes the flights to carry displaced earth up and out of the hole, not the direction which would cause the flights to convey loose earth down into the hole.)

In these operations where a hole is to be (or is being) drilled/bored using an auger connected to an excavator (i.e. as just described), usually a very important consideration is ensuring that the hole is bored with the correct orientation. By way of example, very often (e.g. where the hole is being drilled/bored for the purposes of receiving or creating a pillar, pier or other building or structural foundation (or the like), it will be intended that the hole (and all of it) should be vertical, or at least as close to vertical as can be achieved within acceptable tolerance limits. Generally, in order for a hole (along its full length) to be bored vertically, the auger boring the hole must be kept "plumb" (i.e. oriented perfectly vertically), or as close to this is possible, throughout the drilling operation.

In order to help maintain the correct orientation of the auger as a hole is being drilled/bored, if the auger is detected to have tilted or moved out of alignment ("off-plumb"), it is generally possible for the operator of the excavator (indeed it is normally the operator's job) to make adjustments to correct the orientation/alignment of the auger (e.g. to bring it back to vertical/plumb). By way of further explanation, if, for example, it is detected that the auger is beginning to tilt off-vertical ("off-plumb") in one direction, the operator of the excavator may often use the controls in the excavator's cabin to adjust the excavator boom, or more specifically to move the boom so as to change the position of the end 72 of the boom. Adjusting the position of the end 72 of the boom consequently causes the position of the auger drive 40 (and the adapter 30, if present) to change. And, adjustments to the position of the end 72 of the boom can be used to thereby pull/push the auger drive, and thereby cause the top end of the auger, which is connected to the auger drive, to also be pulled/pushed back in the opposite direction to the direction in which the auger has tilted (or in whatever direction is necessary), thereby bringing the auger back to vertical/plumb.

It should be noted here that, whilst it is very common for augers connected to excavators to be used to drill vertical holes, there are also situations where the need arises to drill a hole at some angle other than vertical. In other words, there is sometimes a need to drill or bore a hole at a particular non-vertical angle, and it is possible that an auger connected to an excavator may be used to do this. For the avoidance of doubt, embodiments of the present invention could be used in helping to maintain the correct orientation/alignment of an auger during such non-vertical hole drilling/boring operations (and indeed embodiments of the present invention might also be used where, say, a screw pile or some other kind of foundation needs to be installed or formed at some non-vertical angle, to help ensure that this occurs with the correct alignment). Nevertheless, for simplicity of explanation, further discussion and explanation of the present invention will be given with reference to situations wherein a hole is to be drilled/bored vertically using an auger connected to an excavator, and where it is thus important help ensure that the orientation, or the angle of alignment, of the auger maintained at plumb (vertical), or brought back to plumb (preferably as quickly as possible) should it tilt or diverge, during the drilling/boring operation.

It was explained above that it is generally possible for the operator of the excavator to make adjustments to correct the orientation/alignment of an auger during a drilling/boring operation. However, in order for this to be done, there must generally be some way for the excavator operator to continuously monitor the orientation/alignment of the auger as drilling is performed, so that they can know if/when the auger moves/tilts off-vertical, and in which direction a correction needs to be made to restore it to vertical.

A number of systems have previously been proposed to assist excavator operators with this. In general, most of these previous systems operate using an inclinometer or some other form of orientation sensor. This orientation sensor is quite often mounted on top of the auger drive, and it therefore actually operates to continuously measure/detect the orientation of the auger drive. However, as may be evident from the explanations above and FIG. 1, the auger itself is generally fixedly (i.e. rigidly) connected to the output (or output shaft) of the auger drive. Therefore, it is generally assumed that there is little or no deflection or deformation between the auger drive and the auger itself, and that consequently there is little or no significant difference between the orientation of the auger drive and orientation of the auger itself. In other words, the measured/detected orientation of the auger drive is assumed to be a good proxy (i.e. it is directly indicative) of the orientation of the auger, and the continuously measured/detected orientation of the auger drive is therefore used to provide a continuous indication of the orientation of the auger itself. To put this yet another way, assuming that there is no deflection/deformation or difference in orientation between the auger drive and the auger itself, it is possible to determine (continuously) the orientation of the auger directly from the (continuously) detected/measured orientation of the auger drive. This is therefore how many previous systems have determined the orientation of the auger.

As has been mentioned, in previously proposed systems, the orientation sensor generally operates to detect/measure, and provide (or provide signals containing) the orientation/alignment of the auger continuously (or at least in fast succession), i.e. effectively in real time insofar as the excavator operator is concerned. Furthermore, in these systems, the orientation sensor is generally connected via a cable, which carries the signals corresponding to the orientation measurements of the auger, and which runs from the location of the orientation sensor (often on top of the auger drive) all the way along the excavator boom, and ultimately to a visual readout display (e.g. a screen) located in the cabin of the excavator. Thus, the orientation sensor continuously (or effectively continuously) generates signals indicative of the orientation of the auger, and these are conveyed to the in-cabin display unit where they are converted into visual indications appearing on the display which the excavator operator can use to (if necessary) make adjustments/corrections to the auger orientation, as discussed above.

The appearance of the in-cabin display (i.e. what information is presented on the display, and how it is presented, etc) is different for different ones of these previously proposed systems. However, in at least some earlier systems, the display is in the form of a screen, and there is often a circle displayed on the screen. Whilst the exact appearance of the circle varies from system to system, it is generally common that the circle represented on the screen is essentially a planform (i.e. "top-down") representation of the hole being bored by the auger. In many of these systems there is also a visible dot produced on the screen. This dot generally represents the central/longitudinal axis of the auger at a given point in time, so whenever the auger is plumb, the dot will be located in the centre of the circle on the screen. However, during operation, if/when the auger is detected to have tilted off-vertical, the dot will move away from the centre of the circle. As may be evident, the direction in which the dot moves on the screen provides the excavator operator with an indication of the direction in which the auger has tilted, and the distance which the dot moves (i.e. away from the centre of the circle) provides an indication of how much the auger has tilted. Also, in some systems, the colour of the circle may also change when the auger is detected to have tilted, and the colour of the circle may provide an additional indication of the severity of the auger's tilt. So, for example, in some systems, when the auger is detected to be plum, the circle will be shown on the screen in green (and of course the dot on the screen will also be in the centre of the circle). However, if the auger is detected to have tilted by a small amount, the circle may become depicted or highlighted in e.g. glowing yellow (and of course the dot will have moved a small distance away from the centre of the circle, as discussed above). And if the auger is detected to have tilted by a larger/extreme amount, the circle on the screen may become depicted or highlighted in e.g. glaring red (and of course the dot will have moved even further away from the centre of the circle). In any case, with these previous systems, it is from these indications provided on the in-cabin screen that the operator is able to determine which direction the auger must therefore be pulled/pushed in in order to correct/realign it.

One of the problems with previously-proposed systems like the ones described above is that the excavator operator is generally the only person who is able to see the display in the cabin, and therefore it is the only the operator who is provided with any information about whether or not the auger is in the correct alignment/orientation as the drilling operation progresses (it should be borne in mind that small tilts or variations of the auger alignment, whilst often significant and important to avoid, may be difficult or impossible to perceive simply by the naked eye to an observer standing nearby). Hence, with these previous systems, it is not generally possible for anyone outside the excavator cabin (e.g. a site supervisor or superintendent who may be standing nearby) to monitor and know whether or not the hole is being drilled with the correct alignment.

It is thought that it may be beneficial if this problem could be alleviated or at least reduced somewhat. It is also thought that it might be desirable to provide an alternative to the existing systems discussed above.

It is to be clearly understood that mere reference in this specification to any previous or existing devices, apparatus, products, systems, methods, practices, publications or indeed to any other information, or to any problems or issues, does not constitute an acknowledgement or admission that any of those things, whether individually or in any combination, formed part of the common general knowledge of those skilled in the field, or that they are admissible prior art.

SUMMARY OF THE INVENTION

In a first aspect, the present invention relates broadly to apparatus for use in maintaining a desired orientation of an implement, the apparatus comprising:

orientation sensing equipment operable to sense the orientation of the implement, and an orientation indicator operable to be mounted to, or relative to, the implement, the orientation indicator having a plurality of indication portions, and when the orientation indicator is mounted relative to, or relative to, the implement, the indication portions are positioned so as to be visible (or at least able to be made visible) from different locations around the implement, wherein, in use, when the orientation of the implement deviates from the desired orientation, one or more indication portions provide a visible indication of a direction in which the implement has deviated from the desired orientation, and wherein the one or more indicating portions include a first indicating portion and a second indicating portion located generally opposite to the first indicating portion, and the first indicating portion indicates in a first manner and the second indicating portion indicates in a second manner when orientation of the implement deviates from the desired orientation.

In one embodiment, the one or more indicating portions form a first array of indicators and one or more indicating portions form a second array of indicators located generally opposite to the first array, and the first array of indicators indicate in a first manner and the second array of indicators indicate in a second manner when orientation of the implement deviates from the desired orientation. This may thereby facilitate or allow a correction of the implement orientation to be made, e.g. by an operator of the equipment being used to operate the implement, or possibly even automatically. However, regardless of whether the implement orientation correction is made with some kind of operator (or human) input, automatically, nevertheless the invention in the broad forms outlined above at least enables an observer, who could possibly be standing or viewing (being provided with a view of) the implement from a range of different locations around the implement, to know of the deviation by the implement, and it may also allow the observer to observe that the implement deviation is corrected.

Without placing any restriction or limitation on the broad forms of the invention described above, it is envisaged that the implement will often be a rotating tool or device (e.g. an auger or screw pile, or a drill bit, etc) which is attached for operation to an implement rotation drive unit, or to an implement rotating mechanism or system (e.g. an auger drive, or a handheld power drill, etc).

In some embodiments, the orientation indicator may become mounted relative to the implement by being mounting to, or relative to, the implement rotation drive unit. Where this is the case, the orientation sensing equipment may includes a portion that is operable to be mounted to, or relative to, the implement rotation drive unit, and the orientation sensing equipment may be operable, when so mounted and in use, to sense the orientation of the implement by sensing the orientation of the implement rotation drive unit and relating this to the orientation of the implement (e.g. by performing any necessary computations or calculations based on the (known) geometry of the implement, the implement rotation drive unit, etc).

The orientation sensing equipment may be operable to continuously (or effectively continuously, or at least repeatedly at fast-repeating time intervals) sense the orientation of the implement, and in use the orientation sensing equipment may also be operable, at least when the orientation of the implement deviates from the desired orientation (but it may do so at all times, regardless of whether or not the implement has deviated from the desired orientation), to generate signals indicative of (or representing or containing information to describe) the orientation of the implement. The signals may be transmitted to the orientation indicator. In use, when the orientation of the implement deviates from the desired orientation, signals generated by the orientation sensing equipment may cause one or more indication portions of the orientation indicator to provide a visible indication of a direction in which the implement has deviated from the desired orientation.

The implement rotation drive unit referred to above may have an outer housing, the orientation indicator may be operable to be mounted to, or relative to, the outer housing, and when so mounted the plurality of indication portions of the orientation indicator may become positioned at spaced locations around the outer housing.

In some embodiments, the outer housing of the implement rotation drive unit may be substantially cylindrical with a principal axis corresponding to (i.e. collinear with or parallel to) the axis of rotation of the implement, and where this is the case, when the orientation indicator is mounted to, or relative to, the outer housing, the plurality of indication portions may become positioned around the perimeter of the cylindrical outer housing in a plane generally perpendicular to the principal axis of the housing.

The plurality of indication portions of the orientation indicator may comprise (or they may at least include, possibly in addition to other means for providing a visible indication of implement deviation direction, such as e.g. parts of the orientation indicator which move or change shape etc) light-emitting elements (e.g. lightbulbs, LEDs, etc). Where this is the case, in use, when the orientation of the implement deviates from the desired orientation, one or more of the light-emitting elements may illuminate in a manner that provides a visible indication of a direction in which the implement has deviated from the desired orientation.

In some particular embodiments, an array of light-emitting elements may be provided, and the individual light-emitting elements in the array may be arranged relative to one another to form a line of light-emitting elements defining a closed shape corresponding to, and extending around (when the orientation indicator is mounted to, or relative to, the outer housing), the perimeter of the outer housing of the implement rotation drive unit.

In particular embodiments like those referred to above, an array of light-emitting elements may be provided, and the individual light-emitting elements in the array may be arranged relative to one another to form a line of light-emitting elements defining a circle corresponding to, and extending around (when the orientation indicator is mounted to, or relative to, the outer housing), the circular perimeter of the cylindrical outer housing of the implement rotation drive unit. In this embodiment, the array of light emitting elements may comprise a ring of light emitting elements.

In any case, where an array of light-emitting elements is provided as discussed above, in use, when the orientation of the implement deviates from the desired orientation (e.g. by more than a predetermined threshold or tolerance amount)

one or more of the light-emitting elements forming a first portion of the array, which extends along or around a first perimeter portion of the outer housing, may illuminate(s) in a first manner, and one or more of the other light-emitting elements forming a second portion of the array, which extends along or around a second perimeter portion of the outer housing on generally the opposite of the housing from the first perimeter portion, may illuminate(s) in a second manner.

Where this is the case, the one or more light-emitting elements forming the first portion of the array, and the one or more light-emitting elements forming the second portion of the array, may not be fixed, and from time to time, depending on which direction the orientation of the implement has deviated in, different ones of the light-emitting elements may form part of either one or the other of the first and second portions of the array. By way of further explanation, it will generally be the case that, at any given time, a single light-emitting element cannot be a part of both the first and second portions of the array (recalling that the light-emitting elements that form the respective array portions are illuminated in respect of manners). Also, often, a given light-emitting element may not be part of either of the illuminated portions of the array, and in fact at a given time there may be multiple individual lights-emitting elements that do not form part of either illuminated portion of the array, in which case that/those light-emitting element may remain off/unilluminated. Of course, just because certain light-emitting element(s) do not form part of either illuminated portion of the array at one time, does not mean that they will not form part of one, or other, illuminated portion of the array at a different time, if/when the direction of a deviation in the orientation of the implement is different.

In embodiments such as those discussed above, the length of the first perimeter portion of the outer housing, along or around which the first portion of the array extends (when the orientation indicator is mounted to, or relative to, the outer housing), may be less than half the perimeter length. Also, the length of the second perimeter portion of the outer housing, along or around which the second portion of the array extends (when the orientation indicator is mounted to, or relative to, the outer housing), may be less than half the perimeter length. Preferably, the length of the first perimeter portion of the outer housing, along or around which the first portion of the array extends (when the orientation indicator is mounted to, or relative to, the outer housing), may be between about one third and about one sixth of the perimeter length, and the length of the second perimeter portion of the outer housing, along or around which the second portion of the array extends (when the orientation indicator is mounted to, or relative to, the outer housing), may be between about one third and about one sixth of the perimeter length.

Embodiments may be provided wherein the plurality of light-emitting elements includes light-emitting elements which are operable, when illuminated, to emit light of at least two different wavelengths/colours. Some more specific embodiments may also be provided wherein the plurality of light-emitting elements includes light-emitting elements which are operable, when illuminated, to emit light of at least two different wavelengths/colours, and wherein, in use, when the orientation of the implement deviates from the desired orientation (e.g. by more than a predetermined threshold all tolerance amount)

the one or more light-emitting elements forming the first portion of the array illuminate(s) in a first colour, and the one or more light-emitting elements forming the second portion of the array illuminate(s) in a second colour.

Alternatively, embodiments may be provided wherein, in use, when the orientation of the implement deviates from the desired orientation (e.g. by more than a predetermined threshold or tolerance amount)

the one or more light-emitting elements forming the first portion of the array illuminate(s) in a flashing or blinking manner, and the one or more light-emitting elements forming the second portion of the array illuminate(s) in a "solid" or "constantly-on" or "non-flashing/non-blinking" manner.

In some more specific variants of this, embodiments may be provided wherein, in use, when the orientation of the implement deviates from the desired orientation (e.g. by more than a predetermined threshold all tolerance amount)

one or more light-emitting elements forming the first portion of the array illuminate(s) in a flashing or blinking manner, one or more light-emitting elements forming the second portion of the array illuminate(s) in a "solid" or "constantly-on" or "non-flashing/non-blinking" manner, and the colour of the light emitted by certain light-emitting element(s) indicates the extent to which the orientation of the implement has deviated from the desired orientation.

In the particular embodiments described in the previous paragraph, in use, when the orientation of the implement deviates from the desired orientation, the colour of the light emitted by the light-emitting elements in the first portion of the array may be the same as the colour of the light emitted by the light-emitting elements in the second portion of the array, and the colour of the emitted light may indicate the extent to which the orientation of the implement has deviated from the desired orientation. In other words, light of different colours emitted from the respective illuminated portions of the array may indicate differing degrees or amounts by which the implement has deviated from the desired orientation.

In another form, the present invention relates broadly to an orientation indicator operable for use in maintaining a desired orientation of an implement, wherein the orientation indicator is operable to be mounted relative to the implement, the orientation indicator having a plurality of indication portions, and when the orientation indicator is mounted relative to the implement, the indication portions are positioned so as to be visible (or able to be made visible) from different locations around the implement, and wherein, in use, when the orientation of the implement deviates from the desired orientation, one or more indication portions provide a visible indication of a direction in which the implement has deviated from the desired orientation, and wherein the plurality of indicating portions include a first indicating portion and a second indicating portion located generally opposite to the first indicating portion, and the first indicating portion indicates in a first manner and the second indicating portion indicates in a second manner when orientation of the implement deviates from the desired orientation. Features, characteristics, operational and performance attributes, etc, described above with reference to the first-mentioned form of the invention may also form part of, or they may also be applicable to, this second form of the invention.

In a further form, the present invention relates broadly to a method for maintaining a desired orientation of an implement, comprising:

providing orientation sensing equipment operable to sense the orientation of the implement, providing an orientation indicator which is operable to be mounted relative to the implement, the orientation indicator having a plurality of indication portions, and when the orientation indicator is mounted relative to the implement, the indication portions are positioned so as to be visible (or able to be made visible) from different locations around the implement, and wherein the plurality of indicating portions include a first indicating portion and a second indicating portion located generally opposite to the first indicating portion, and the first indicating portion indicates in a first manner and the second indicating portion indicates in a second manner when orientation of the implement deviates from the desired orientation, mounting the orientation indicator relative to the implement;

operating the orientation sensing equipment and the orientation indicator while the implement is in use such that, when the orientation of the implement deviates from the desired orientation, one or more indication portions provide a visible indication of a direction in which the implement has deviated from the desired orientation, and correcting the orientation of the implement.

Correction of the implement orientation may be made, e.g. by an operator of the equipment being used to operate the implement, or possibly even automatically. However, regardless of whether the implement orientation correction is made with some kind of operator (or human) input, automatically, nevertheless implementation of this method form of the invention, again, at least enables an observer, who could possibly be standing or viewing (or being provided with a view of) the implement from a range of different locations around the implement, to know of the deviation by the implement, and it also allows the observer to observe that the implement deviation is corrected. In any case, features, characteristics, operational and performance attributes, etc, described above with reference to the first-mentioned form of the invention may also form part of, or they may also be applicable to, mutatis-mutandis, this method form of the invention.

In all embodiments of the present invention, the orientation indicator may be visible to an operator of the implement. The operator of the implement may be housed in a cabin of a vehicle.

In all aspects of the present invention, the one or more indicating portions may form a first array of indicators and one or more indicating portions may form a second array of indicators located generally opposite to the first array, and the first array of indicators indicate in a first manner and the second array of indicators indicate in a second manner when orientation of the implement deviates from the desired orientation.

According to a second aspect, the present invention provides an apparatus for use in maintaining a desired orientation of an implement, the apparatus comprising:

orientation sensing equipment operable to sense the orientation of the implement, and an orientation indicator operable to be mounted to the implement or to a drive unit or a gearbox for the implement, the orientation indicator comprising an illumination device or a plurality of illumination devices extending substantially around the implement or extending substantially around the drive unit or gearbox for the implement.

In one embodiment, the illumination device or a plurality of illumination devices extend substantially or wholly around a periphery of the implement or extend substantially around or wholly around a periphery of the drive unit or gearbox for the implement.

In one embodiment, the orientation indicator provides a plurality of illumination devices extending substantially around the drive unit or the gear box. In one embodiment, the plurality of illumination devices comprises a plurality of lightbulbs or a plurality of light emitting diodes.

In one embodiment, the orientation indicator comprises an illumination device in the form of a ring, or the orientation indicator comprises a plurality of illumination devices arranged in a ring.

In one embodiment, the orientation indicator illuminates when the implement is in a correct orientation or within a predetermined margin of a correct orientation. In another embodiment, the orientation indicator illuminates when the implement is away from a correct orientation.

In one embodiment, the orientation indicator illuminates in a manner as described with reference to the first aspect of the present invention. In some embodiments, the orientation indicator is arranged as described with reference to the first aspect of the invention, although the illumination of the illumination device(s) may differ.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIG. 8 is a perspective illustration of the upper side of the inclinometer unit.

FIG. 9 is a perspective illustration of the underside of the inclinometer unit.

FIG. 10A is a schematic (planform) representation of the stem of an auger when the auger is perfectly plum (i.e. oriented perfectly vertically). FIG. 10B illustrates the way in which the LED light ring illuminates when the auger is oriented as represented in FIG. 10A.

FIG. 11A is a schematic (planform) representation of the stem of an auger when the auger is tilting by a relatively small amount in the direction indicated by the arrow in FIG. 11A. FIG. 11B illustrates the way in which the LED light ring illuminates when the auger is oriented as represented in FIG. 11A.

FIG. 12A is a schematics (planform) representation of the stem of an auger when the auger is tilting by a relatively larger amount in the direction indicated by the relatively larger arrow in FIG. 12A. FIG. 12B illustrates the way in which the LED light ring illuminates when the auger is oriented as represented in FIG. 12A.

DETAILED DESCRIPTION

Figure 1:
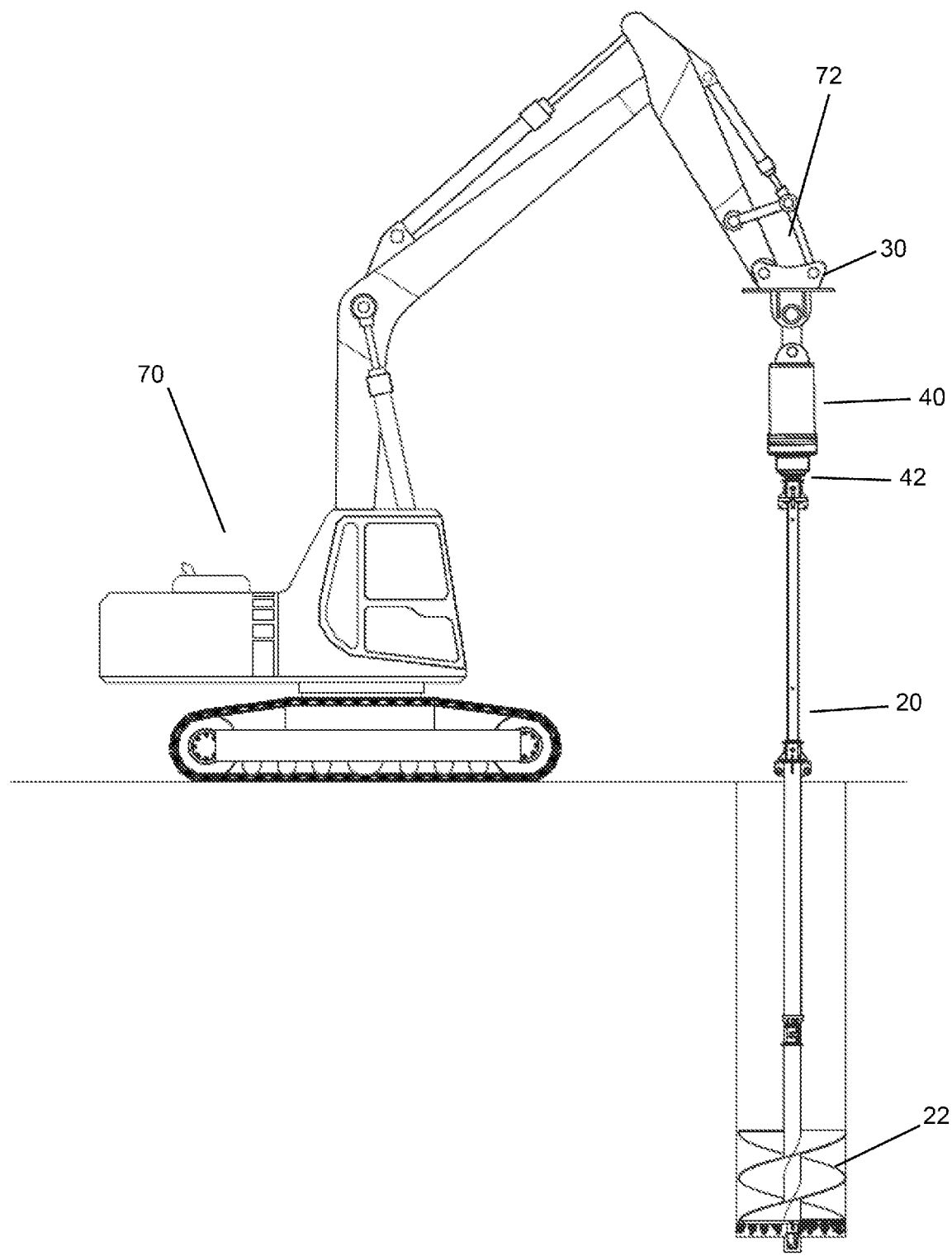
FIG. 1 is an illustration of a conventional arrangement whereby an auger drive (hydraulic motor) is connected (via an adapter in this example) to the end of the boom on an excavator, and an auger is attached to the output shaft of the auger drive. The auger can be operated to bore a hole by the excavator operator sitting in the excavator cabin.

Referring initially to FIG. 2A, this Figure is a schematic (and partially cross-sectional) view of an auger drive unit 400 of fairly conventional design (e.g. it is similar to the auger drive 40 shown in FIG. 1). The motor of the auger drive unit is not actually illustrated; however its location within the overall unit 400 is clearly shown by reference number 402. Actually, in FIG. 2A, reference number 402 may be considered to refer to the motor's housing/casing (or the outline of this casing) inside which the motor is contained within the overall auger drive unit 400. As has been mentioned previously, auger drive units are often hydraulically powered, and where this is so the motor will generally be a hydraulic motor (typically driven by hydraulic fluid supplied from the hydraulic system of an excavator to which the auger drive is attached in use). Of course, it is possible that the motor could be some other kind of motor, for example, an electric motor.

In any case, located immediately below the auger drive motor's housing 402, and connected to the motor, is a gearbox 404. The operation of a gearbox will be well understood by those of skill in this area and therefore need not be discussed. On the lower side of the gearbox 404, and connected to the output of the gearbox 404, is the output shaft 420 of the auger drive unit. The hole that is visible extending through the output shaft 420 exists to facilitate connection of the output shaft 420 to e.g. an auger (or to some other implement to be operated using the auger drive unit). Note that the output shaft 420 corresponds generally to (or is equivalent to) the output 42 of the auger drive 40 shown in FIG. 1.

In FIG. 2A, FIG. 2B and FIG. 2C, an upper portion of the output shaft 420 is not visible because it is contained (and therefore hidden) inside a housing 410. The actual connection between the upper portion of the output shaft 420 and the gearbox 404 is also therefore not visible as it is within this housing. The stationary housing 410 inside which the upper portion of the output shaft 420 is contained, and inside which the upper portion of the output shaft 420 rotates, is (i.e. the housing 410 is) connected to the gearbox 404 (or to the outer housing/casing of the gearbox). Note that there are holes extending vertically through the outside portion of the housing 410, and likewise there are holes extending through the outer edge of the gearbox's housing. These holes in the housing 410 and in the gearbox housing are aligned and of common (or at least similar) internal diameter, so that a number of (fairly large e.g. M10) bolts 408 can extend up through the holes in the housing 410 and through the holes in the gearbox housing. These holes may be (although they need not necessarily be) internally threaded so that the bolts 408 can directly engage with housing 410 and the gearbox housing.

The motor casing 402 (inside which the motor is contained) has one or more lower, radially outer portions that, in effect, flare horizontally outwards and thereby define one or more shelf portions 403. In some cases, there may be only a single shelf portion 403 that extends circumferentially all the way around the outer perimeter at the base of the motor casing 402. Alternatively, there may be multiple separate shelf portions 403, each of which extends in a small circumferential arc, but with spaces in between such that there is no single shelf portion extending all the way around. For convenience, further explanation will be provided with reference to the case where there is a single shelf 403 that extends circumferentially all the way around the outer perimeter at the base of the motor casing.

This circumferential shelf 403 is located directly above, and when the auger drive unit 400 is assembled it is connected to, the outer edge of the housing of the gearbox 404. The circumferential shelf 403 has holes extending through its full thickness, and these are aligned and of common (or at least similar) internal diameter to the holes in the housing 410 and the gearbox housing. Hence, as shown, the bolts 408 can also extend up and through these holes in the shelf 403.

The auger drive unit 400 also includes a hood 430. The wall thickness of the hood 430 is greater in the lowermost part (or the lower rim) thereof compared to the wall thickness in other parts of the hood. In this thicker lowermost rim portion of the hood 430 there are a number of blind bore holes. These blind bore holes are threaded and, once again, these holes are aligned with the holes in the housing 410, the gearbox housing, and the motor casing 402. Hence, when the hood 430 of the auger drive unit is placed over the motor casing 402 (and assuming all the other parts of the auger drive unit 400 described previously are assembled together), the bolts 408 can extend up, and in this case, they screw into the internal threads that are formed within the holes in the thicker lowermost rim portion of the hood 430. The bolts 408 therefore operate to, at least, secure the hood 430 on top of the motor casing 402. The bolts 408 may also play a role in securing one or more of the housing 410, the gearbox housing and the motor casing 402 together, e.g. if the outer through holes in these components are threaded as discussed above.

On the top of the hood 430 is a pair of upstanding lugs 432 each with a circular hole formed therethrough. Note that only one of the lugs 432 is visible in FIG. 2, because the other (non-visible) lug 432 is located directly behind (and is therefore hidden by) the visible lug 432. These upstanding lugs 432 on the hood 430 are often referred to as the "hood ears" 432, and the auger drive unit 400 can be connected to e.g. the end of an excavator boom (either directly or via an adapter) by connecting (bolting or otherwise securing) the hood ears 432 thereto.

Turning next to FIG. 2B and FIG. 2C, an explanation will now be given with reference to these Figures for how the inclinometer unit and the LED ring unit used in the present embodiment of the present invention can be installed on the auger drive unit 400.

As shown in FIG. 2B, the first step in this installation process is to unscrew and remove the bolts 408, so that the hood 430 can be lifted off the top of the motor casing 402. See FIG. 2B. Next, it will be appreciated (although this is not specifically illustrated) that once the hood 430 has been fully removed from the top of the motor casing 402, the inclinometer unit 500 can then be installed directly onto the flat upper/top surface of the motor casing 402. FIG. 2C shows the inclinometer unit 500 mounted on top of the motor casing 402.

Figure 6:
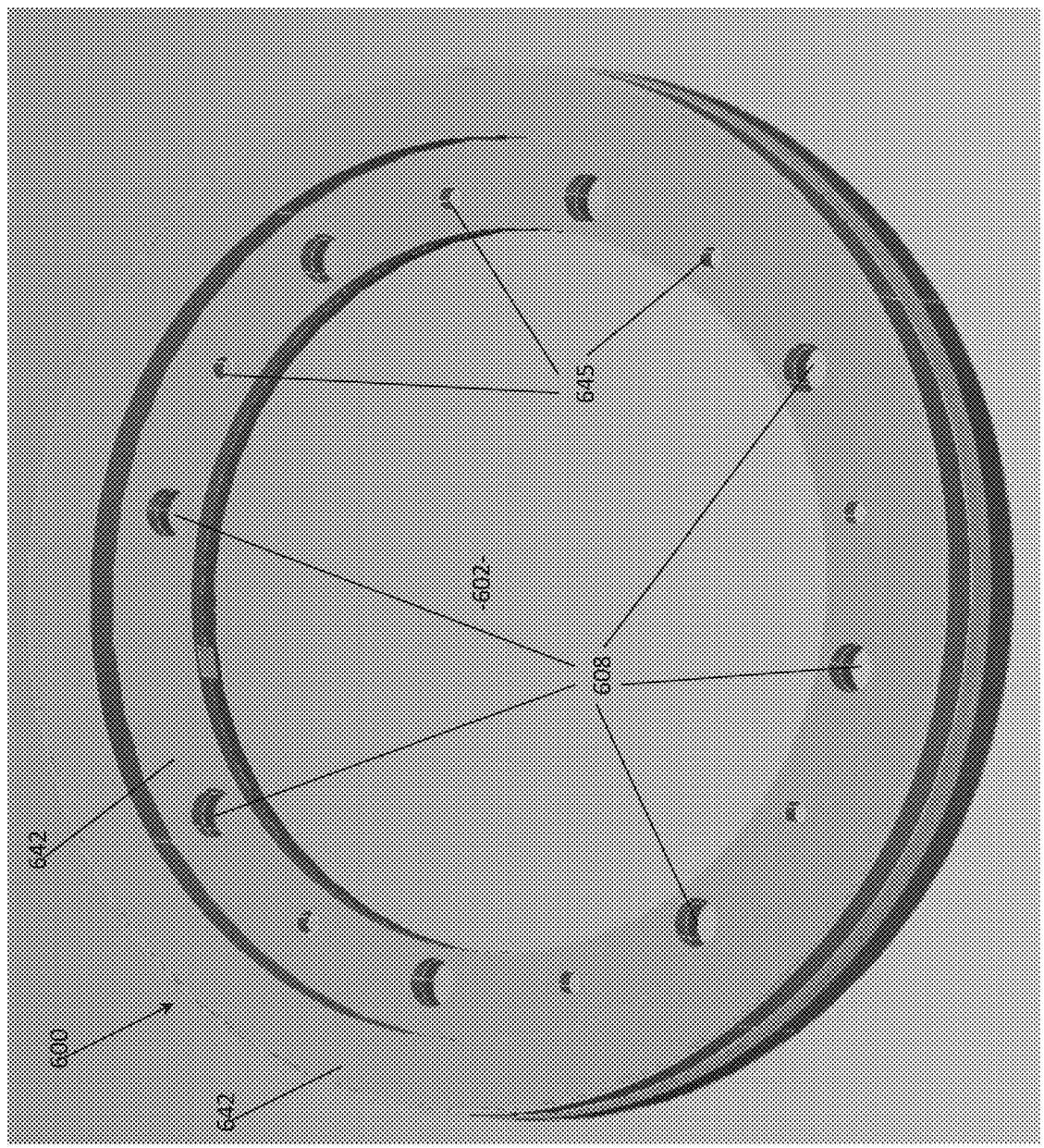
FIG. 6 is a perspective illustration substantially from above of the LED ring unit.
Figure 7:
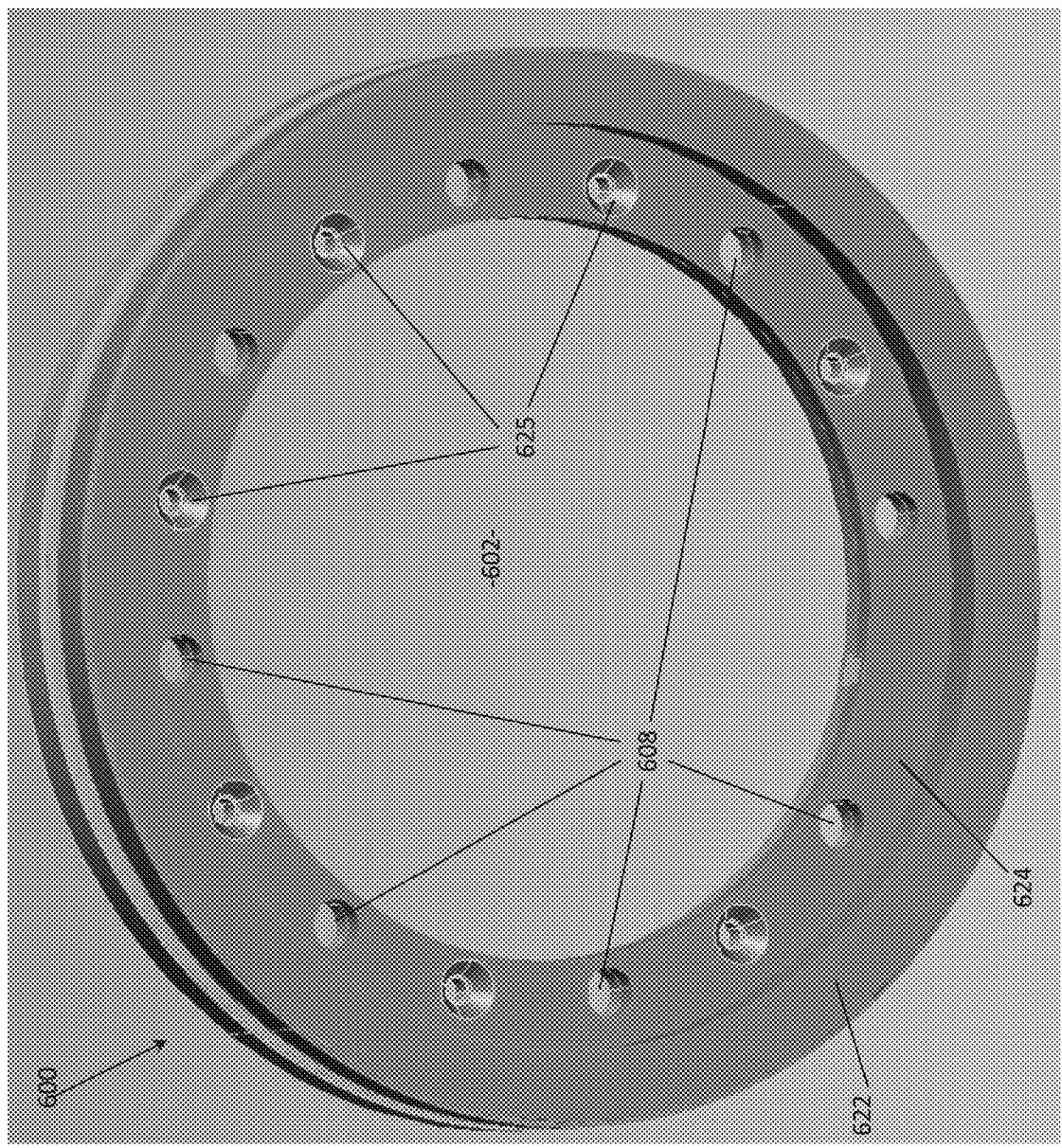
FIG. 7 is a perspective illustration substantially from underneath the LED ring unit.

Referring briefly now to FIG. 6 and FIG. 7 below, it will be seen from these Figures that the LED ring unit 600 has an overall flat, ring-like shape, with a large circular opening (open through-space) 602 extending through the centre thereof. The diameter of this circular opening 602 in the LED ring unit 600 is larger than the outer diameter on any part of the motor casing 402 other than the circumferential shelf 403. Therefore, returning to FIG. 2B and FIG. 2C, it will be appreciated that, while the hood 430 is removed from the motor casing 402, the LED ring unit 600 can be installed by effectively "slotting" the LED ring unit 600 down over the top of the motor casing 402, so that the LED ring unit 600 comes to sit directly on top of the outer circumferential shelf 403 at the base of the motor casing 402, as shown in FIG. 2C.

It will also be seen from e.g. FIG. 6 and FIG. 7 that the LED ring unit 600 has a number of cylindrical through holes 608 therein. These cylindrical through holes 608 are radially located (i.e. at a distance out from the geometric centre of the LED ring unit 600) and circumferentially spaced from one another such that they align with, and they are also of common (or at least similar) internal diameter to, the holes in the housing 410, the gearbox housing, the motor casing 402, etc. Therefore, when the LED ring unit 600 is being installed, after it has been "slotted" over the top of the motor casing 402 and is sitting on the circumferential shelf 403 at the base of the motor casing 402, the LED ring unit can then be turned/twisted in order to bring the various holes 608 into register with the holes in the housing 410, gearbox housing, etc. Thereafter, the hood 430 can be placed back over the top of the motor casing 402, such that the lower rim of the hood 430 rests directly on top of the LED ring unit 600, and then the bolts 408 can once again be reinserted through the housing 410, through the gearbox housing, through the housing 402, and now also through the LED ring unit 600, before being screwed into the threaded blind holes in the rim of the hood 430 to secure (clamp) the hood 430 in place on top of the LED ring unit. Note that the bolts 408 originally used for securing the hood 430 directly on top of the motor housing 402 (e.g. as in FIG. 2A) may need to be replaced by bolts of the same shaft diameter and thread configuration, etc, but which are slightly longer than the original bolts, in order to account for the slight increase in the overall height of the auger drive unit 400 that is created when the LED ring unit 600 is installed. In other words, when the LED ring unit 600 is installed, as shown in FIG. 2C, the distance which the bolts 408 must extend, from beneath the housing 410 and ultimately to screw into the blind holes in the underside of the rim of the hood 430, is greater than when the LED ring unit 600 is not present, as shown in FIG. 2A.

Figure 2:
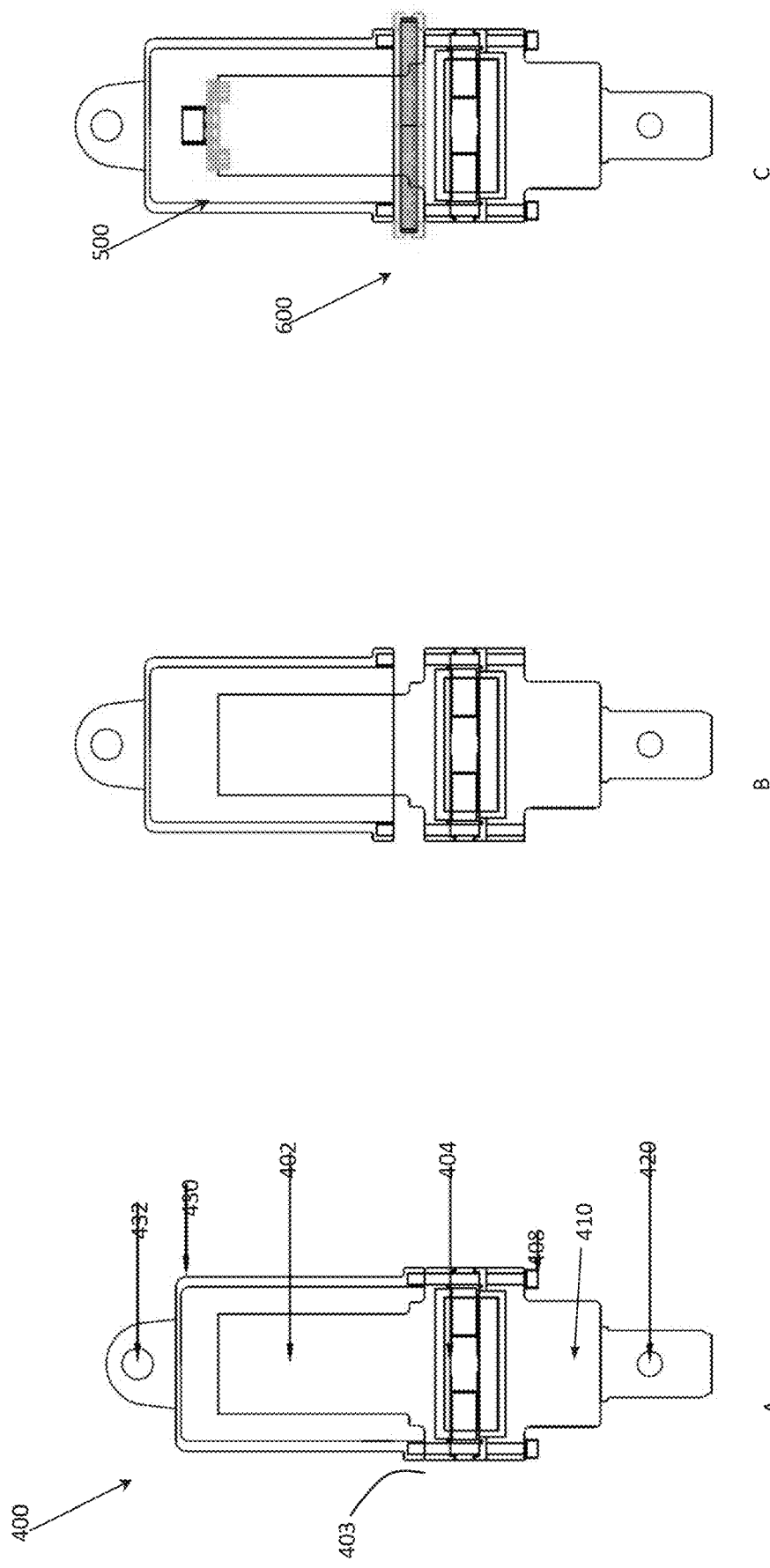
FIG. 2 contains three views, namely view A (FIG. 2A), view B (FIG. 2B) and view C (FIG. 2C), which together illustrate the way that, in one possible embodiment of the invention, the orientation sensor (an inclinometer in this embodiment) and orientation indicator (an LED ring unit in this embodiment) are installed on a typical auger drive (hydraulic motor) unit.

The above provides an explanation for the way in which the LED ring unit 600 and the inclinometer unit 500 in the present embodiment of the invention can be installed in an auger drive unit like the one shown in FIG. 2. It is therefore useful to next describe the inclinometer unit 500 and the LED ring unit 600.

Figure 3:
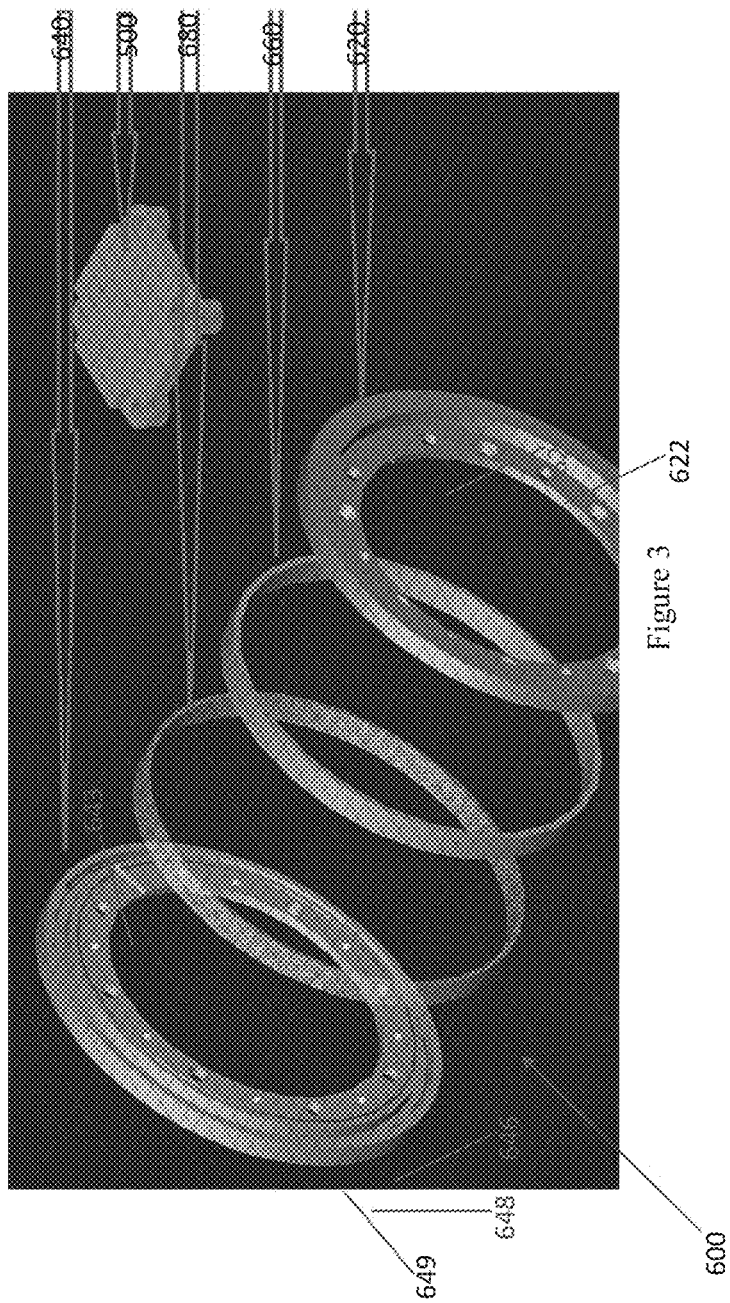
FIG. 3 contains an isometric view of the inclinometer unit, and also an exploded isometric view of various parts of the LED ring unit.

Referring first to the inclinometer unit 500, this is shown in FIG. 3, and also in FIG. 8 and FIG. 9. These Figures do not actually show any of the internals or parts or subcomponents of the inclinometer or which together make up the inclinometer unit 500. Rather, these Figures really just provide a visual representation of the overall configuration (especially the shape) of the inclinometer unit 500. As can be seen, the inclinometer unit 500 is a generally square, flat unit with rounded corners 501. Underneath each corner there is a short cylindrical post 502, and a cylindrical hole 503 extends through each of the corners and axially for the full length of the respective cylindrical posts 502. The cylindrical posts 502 may serve effectively as support legs for the inclinometer unit 500. When this is the case, and when the inclinometer unit 500 is attached to the top surface of the motor casing 402, it may be only the bases of these posts 502 that come into direct contact with the upper surface of the motor casing 402. As a result, in these instances (where it is only the bases of the respective posts 502 that contact with the motor casing 402), other parts of the inclinometer unit 500 may be effectively spaced slightly above the upper surface of the motor casing 402. This space between the upper surface of the motor casing 402 and e.g. the underside of the main square part of the inclinometer unit 500 may allow for, for example, airflow for heat dissipation, or to allow for electrical wire/cable routing, or for further componentry to be positioned within the said space, etc. Alternatively, the cylindrical posts 502 may themselves actually insert into the top of the motor casing 402. In this case, holes to receive the posts 502 may therefore need to be formed in the upper surface of the motor casing 402. In this scenario, the posts 502 may therefore insert through (i.e. through these holes formed in) the upper surface of the motor casing 402, and therefore the underside of the main square part of the inclinometer unit 500 may sit directly on (i.e. in contact with) the upper surface of the motor casing 402. Thus, there may be no space between the upper surface of the motor casing 402 and the underside of the main square part of the inclinometer unit 500. In FIG. 2C, the inclinometer unit 500 is shown mounted to the motor casing 402 in this way.

In any case, in either of the above inclinometer unit mounting scenarios, it will be appreciated that the cylindrical holes 503 that extend axially through each of the posts 502 serve to receive fasteners (e.g. screws, or bolts, or the like) therethrough. In situations where the posts 502 form support legs (and where the bottoms of these support legs are the only parts of the inclinometer unit that touch the top of the motor casing 402), the fasteners that insert through the holes 503 may be bolts which pass down through the holes 503 and then screw directly into the top of the motor casing 402. Alternatively, in situations where the posts 502 themselves actually insert through holes in the motor casing 402, the holes 503 may again receive bolts or the like; however in this case the non-head-end of the bolt may then have a nut (or the like) screwed thereon in order (possibly with the assistance of one or more other parts or components) to thereby clamp the inclinometer unit 500 in or to the top of the motor casing 402.

It will also be noted that there are indents or recesses 505 in the upper surface of the inclinometer unit 500, above each of the posts 502. In other words, the upper (otherwise flat) surface of the inclinometer unit 500 has a number of indents, or recesses, or thinner portions, 505—one directly above each of the posts 502. As a result of these indents 505, the upper square portion of the inclinometer unit 500 has recesses, or depressions, relative to the rest of the upper surface of the inclinometer unit's main square region, above each of the posts 502. These recesses 505 serve to (possibly among other things) receive the heads of the bolts, or possibly to receive nuts screwed onto the threaded ends of the bolts, which extend through the holes 503 two secure the inclinometer unit 500 to the motor casing 402. If these recesses 505 were not provided, the heads of the bolts (or the nuts) which help secure the inclinometer unit 500 to the top of the motor casing would stand proud of the top surface of the inclinometer unit (or at least the bolt heads or nuts would otherwise extend more proud than they do given they can be at least partially received into the recesses 505) in this may e.g. interfere with the mounting or positioning of other objects or componentry on top of the inclinometer unit 500.

The inclinometer unit 500 also has three small round holes, arranged relative to one another to form a triangle, which extend through the thickness of the main square portion of the inclinometer unit. These holes may or may not be threaded, and they may facilitate attachment to the inclinometer unit of, for example, power supply cables for the inclinometer, wired or wireless communication cables or equipment, the mounting of additional sensors, etc, possibly using fairly small fasteners (e.g. M4 bolts).

Whilst an explanation has been given for the configuration (and particularly the shape) of the inclinometer unit 500, and the way in which it can be mounted within the auger drive unit 400, the way in which the inclinometer unit 500 (and the various orientation sensor(s), etc, contained therein) actually functions in the present embodiment is essentially the same as the way in which inclinometers or other orientation sensors operate in other systems. Therefore, like in a number of previously proposed systems, an auger is generally fixedly connected to the output shaft 420 of the auger drive. Therefore, it is generally assumed that, whenever an auger is thus connected, there is little or no deflection or deformation between the auger drive 400 and the auger itself, and that consequently there is little or no significant difference between the orientation of the main/central longitudinal axis of the auger drive unit 400 and orientation of the longitudinal axis of the auger itself. Thus, the measured/detected orientation of the auger drive unit 400 (as measured by the inclinometer unit 500) can be assumed to be a good proxy (i.e. it is directly indicative and allows determination or computation) of the orientation of the auger. Hence, the continuously (or at least rapidly) measured/detected orientation of the auger drive 400 is used to (if necessary perform calculation/computations and) provide a continuous (or rapidly updating) indication of the orientation of the auger.

Thus, in a similar way to previously proposed systems, the inclinometer unit 500 (or the orientation sensor(s) an electronics etc therein) operates to detect/measure, and provide (or provide signals containing/representing) the orientation/alignment of the auger continuously (or at least in fast succession), i.e. effectively in real time insofar as the excavator operator is concerned.

The inclinometer unit 500 may be connected via one or more cables, which carry the signals corresponding to the orientation measurements of the auger, from inclinometer unit 500, possibly via one or more other electronic components, to the LED ring unit 600. (Note that, in this embodiment, all such cables would therefore be contained within the space inside the hood 430 of the auger drive unit.) Alternatively, there could be a wireless connection, and signaling between the inclinometer unit 500, the LED ring unit 600, and possibly other electronic components (e.g. control electronics) may be made via this wireless connection.

In any case, the inclinometer unit 500 continuously (or effectively continuously) generates signals indicative of the orientation of the auger, and these ultimately result in signals being conveyed to operate the LED ring unit 600. At the LED ring unit 600, the operating signals are then converted into visual indications which the excavator operator can use to (if necessary) make adjustments/corrections to the auger orientation, as discussed below.

Referring next to the LED ring unit 600, the configuration of this can be appreciated from FIG. 3, FIG. 4, FIG. 5, FIG. 6 and FIG. 7. Referring first to FIG. 3, which contains an exploded isometric view of the components of the LED ring unit 600, it can be seen that the components that together make up the LED ring unit include the lower housing 620, the upper housing 640, the LED ring (or a ring of LEDs) 660 and a protective transparent cover/housing 680 for the LEDs.

Figure 5:
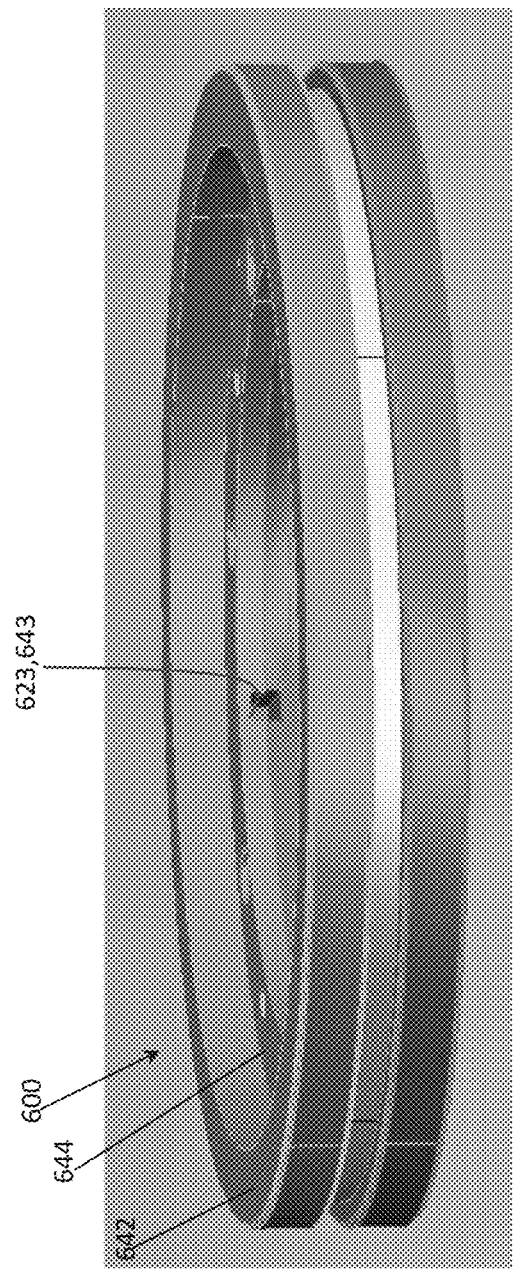
FIG. 5 is a perspective illustration substantially from the side of the LED ring unit when assembled (and with the upper housing in place).

The lower housing 620 and the upper housing 640 are almost identical, and when the LED ring unit 600 is assembled (as shown in FIG. 5, FIG. 6 and FIG. 7) the upper housing 640 is oriented to essentially mirror the lower housing 620, and the LED ring 660 and the transparent cover 680 become securely held between them.

On each of the lower housing 620 and the upper housing 640 there is a radially outer portion 622, 642 and a radially inner portion 624, 644. In some of the Figures, the radially outer portion 622 of the lower housing 620 may appear to be thicker, and the radially inner portion 624 may appear to be thinner, or recessed, relative to the outer portion 622. Similarly, in some of the Figures, the radially outer portion 642 of the upper housing 640 may appear to be thicker, and the radially inner portion 644 may appear to be thinner, or recessed, relative to the radially outer portion 642. However, as can be seen from FIG. 3, whilst the radially outer portion on each of the housings may initially appear to be thicker than the radially inner portion, in fact, there is a channel formed on the inside of the radially outer portion in each housing. Therefore, the actual material or wall thickness is not significantly greater (and it may even be thinner) in the radially outer portion is 622, 642 than in the radially inner portion is 624, 644. The channel 646 formed in the inner (or inward) side of the upper housing 640 is visible in FIG. 3. As can be seen, the channel 646 in the upper housing 640 is formed, in effect, "into" the inner (or inward) side of the housing's radially outer portion 642. Thus, the channel 646 is formed in between the outer perimeter sidewall 648 of the housing 640 and parallel but more inward wall 649 that extends axially between the radially outer portion 642 and the radially more inner portion 644. Thus, the channel 646 is in the shape of a ring or annulus, and the outer wall of the channel 646 is defined by the inner surface of the perimeter edge sidewall 648, and the inner wall of the channel 646 is defined by the outer surface of the wall 649. An identical channel 626 is formed on the inside of the radially outer portion 622 of the lower housing 620, although this cannot be seen (and it is therefore not labelled) in the Figures.

Figure 4:
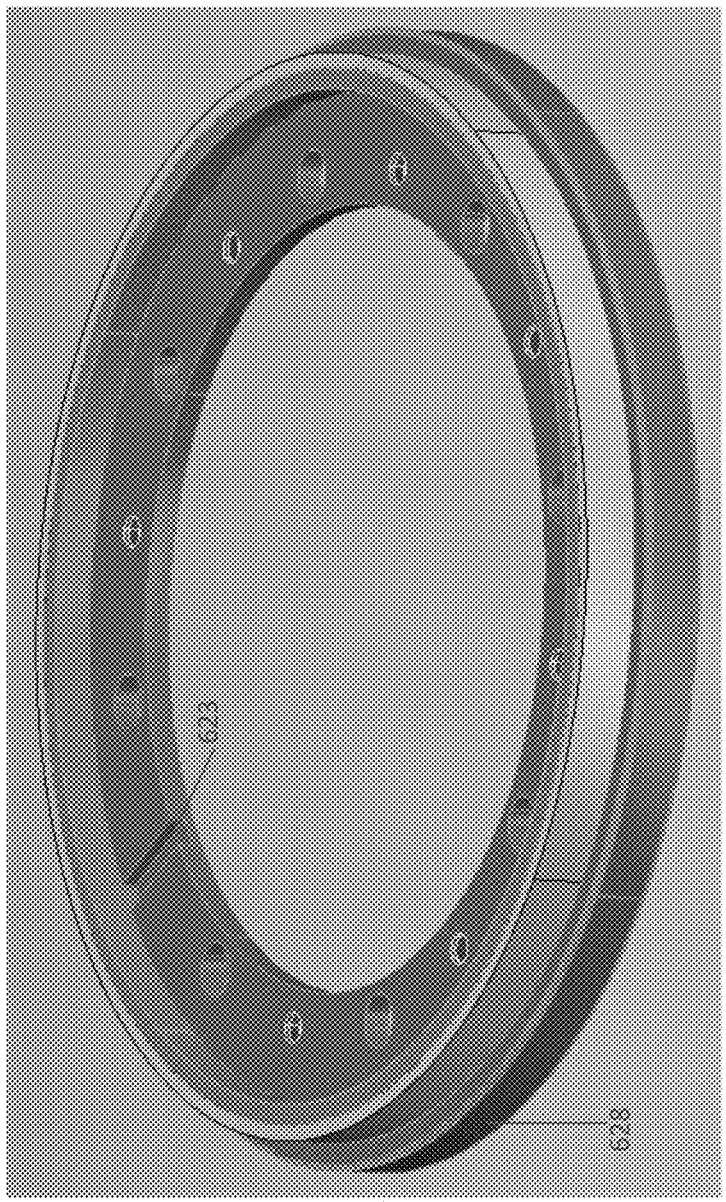
FIG. 4 is a perspective illustration of the LED ring unit when assembled, except that the upper housing of the LED ring unit has been omitted so that the orientation of the LED ring itself, and also the LED ring's transparent protective cover, relative to the lower housing of the LED ring unit, can be appreciated.

Whilst the channel 626 in the lower housing 620 is not visible in the Figures, the way in which this channel 626 operates to receive both the LED ring 660 and the protective cover 680 can be clearly seen in FIG. 4. Indeed, as shown in FIG. 4, the outer diameter of the LED ring (or the ring of LEDs) 660 matches (or is very slightly smaller than) the inner diameter of the protective cover 680. Also, the inner diameter of the LED ring (or the ring of LEDs) 660 matches (or is very slightly greater than) the outer diameter of the wall 649. Furthermore, the outer diameter of the protective cover 680 is the same as (or very slightly smaller than) the inner diameter of the perimeter edge sidewall 648. Accordingly, the LED ring (or ring of LEDs) 660 can be received snugly and concentrically inside the protective cover 680, and because the combined thickness (in a radial direction) of the LED ring (or any of LEDs) 660 and the protective cover 680 matches (or is only marginally smaller than) the thickness of the channel 626, therefore the LED ring (or ring of LEDs) 660 and the protective cover 680, when assembled together concentrically, can be snugly received within the channel 626.

However, it should also be noted from FIG. 4 that the width (or height) of the LED ring 660, which is equal to or slightly greater than the width (height) of the protective cover 680, in an axial direction, is greater than the depth of the channel 626. In fact, the width (height) of the cover 680 is considerably more than double the depth of the channel 626, meaning that the width (height) of the protective cover 680 is considerably greater than the combined depths of the channels 626 and 646 in the lower and upper housings.

In any case, as shown in FIG. 4, when the LED ring 660 and the protective cover 680 are received in the channel 626 in the lower housing 620, the LED ring 660 and the protective cover 680 stand proud of all inward-facing surfaces of the lower housing 620.

The LED ring 660 and the protective cover 680 can also be received in the channel 646 in the upper housing 640 in precisely the same way, and as mentioned above, the width (height) of the LED ring 660 and the cover 680 is considerably more than the combined depths of the channels 626 and 646. Therefore, as can be seen in FIG. 5, when the LED ring unit 600 is fully assembled, the LED ring 660 and the protective cover 680 are effectively held in between the upper housing 640 and the lower housing 620, however because the widths of the LED ring 660 and the protective cover 680 in an axial direction are greater than the collective depth of the channels 626 and 646, consequently when the LED ring unit 600 is assembled with the LED ring 660 and the protective cover 680 held between the respective housings 620, 640, these two components remain visible through the gap/opening that remains between the two housings around the circumference/perimeter of the LED ring unit.

Next, it should be noted that the protective cover 680 is transparent, or at least translucent. Accordingly, when the LED ring unit 600 is in operation and certain of the LEDs in the LED ring 660 become illuminated, the light emitted by the illuminated LEDs passes through the protective cover 680, and this emitted light can be seen from outside the LED ring unit 600 (and indeed from a distance away from the LED ring unit) through the gap between the upper housing 640 and the lower housing 620.

It was mentioned above that the lower housing 620 and the upper housing 640 are almost identical. The only difference (or at least one of the only differences) between the two relates to the shape of the holes through which fasteners are inserted to secure the lower housing 620 and the upper housing 640 together. In FIG. 7 the holes in the lower housing 620 which receive fasteners to secure the lower housing 620 to the upper housing 640 are labelled 625, and it can be seen that these holes 625 are conically tapering. More specifically, the holes 625 taper inwards. In other words, the diameter of the holes 625 becomes progressively narrower in the same direction as the direction in which the fasteners would be inserted into these holes. In FIG. 6 the holes in the upper housing 640 which receive the fasteners that secure the lower housing 620 to the upper housing 640 are labelled 645, and it can be seen that these holes 645 are quite small and cylindrical through the full thickness of the inner portion 642 of the upper housing. Actually, the holes 645 in the upper housing will generally be threaded, and the fasteners (not shown) used for securing the lower housing 620 to the upper housing 640 will be bolts of the type that have a head with a conically tapering shape similar to the shape of the tapering holes 625 in the lower housing 620, and the threaded shafts on these bolts will be configured (in terms of length, diameter and thread configuration) to screw into the holes 645 in the upper housing 640. Actually, on these bolts, the size of the conical head will actually often be such that, when the bolts are each fully screwed into a respective hole 625 and 645 to hold the housings together, the flat top of the head on the bolt will sit flush with (or be recessed slightly relative to) the flat surface of the inner portion 624 on the lower housing 620. Hence, the heads of these bolts will not extend proud of the surface of the inner portion 624, and the reason for this is so that, when the LED ring unit 600 is installed in the auger drive unit 400, it is the surface 624 of the inner portion of the lower housing 620 that rests directly on the shelf 403 (i.e. the heads of the bolts do not protrude proud of the surface 624 and prevent the surface 624 from coming into contact with the shelf 403). As alluded to above, when these bolts are used to secure (i.e. hold) the lower housing 620 and the upper housing 640 together, the LED ring 660 and the protective cover 680 effectively become clamped (and therefore held) between the housings 620 and 640.

The lower housing 620 and the upper housing 640 each also have (in this embodiment) a single channel that (in this embodiment) is square cross-sectioned and which extends radially across the inner portion of 624, 644. This channel in the upper housing 640 is labelled 643 in FIG. 3, in the corresponding channel in the lower housing 620 is labelled 623 in FIG. 4. Furthermore, as can be seen in FIG. 5, when the LED ring unit 600 is fully assembled, the channel 623 in the lower housing 620 and the channel 643 in the upper housing 640 effectively come together to define a rectangular passage that extends from the open circular space 602 on the inside of the LED ring unit 600 to the rear/inside face of the LED ring 600 (which it will be recalled is received in the respective channels 626, 646 and clamped between the housings 620, 640). This rectangular passage allows, for example, electrical cables and connectors to connect with the LED ring 660 in order to thereby supply power and control signals to control the way in which the LEDs in the LED ring 660 are illuminated in operation.

Referring now to the LED ring 660 itself, this could potentially be (i.e. it could be made up of) nothing more than a large number of "loose" LEDs which are positioned, one next to another (e.g. when the LED ring unit 600 is being assembled) to collectively form a ring-shape (in the general shape with which the LED ring 660 is depicted in the Figures). However, alternatively, there might actually be some kind of ring-shaped housing or container which is capable of receiving and holding within it a large number of individual LEDs. The benefit of this might be that, e.g., if one of the LEDs were to blow or fail, it might be possible to simply disassembly the LED ring unit 600, remove this ring-shaped housing/container and take out the single failed LED and replace it with a new working LED, and then reassemble the LED ring unit 600. Otherwise, e.g. if the LED ring 600 were to comprise nothing more than a large number of loose LEDs, each time one disassembles the unit 600, all of the LEDs could potentially fall or "poor" out, and the job of reassembly may then be extremely fiddly (to get all the LEDs back in place, etc).

It is perhaps useful to mention in passing that the LED ring unit 600 may actually be provided in a range of different sizes, the different sizes being intended for installation on/in, and for operation with, auger drive units 400 of different sizes. Whilst the different sized LED ring units may be, in effect, "scaled-down" or "scaled up" versions of one another, one difference between differently-sized LED ring units may be in the number of individual LEDs contained within the respective units' LED ring 660. Technically, the invention is not limited to any particular number of individual LEDs for any particular size of LED ring unit. However, as a general comment, the number of LEDs should preferably be sufficiently high to provide an adequate "resolution" for indicating with adequate precision the particular direction in which a correction to the orientation of an auger may need to be made in the event that the auger has tilted. This will become clearer from the discussion below. Nevertheless, by way of example, in the particular embodiment depicted in the Figures, the auger drive unit 400 is of a similar size to the auger drive unit 40 shown in FIG. 1, and in an LED ring unit 600 sized to be used with such an auger drive unit 400, the number of LEDs contained within the LED ring 660 will be approximately 70-100. Smaller versions of the LED ring unit 600 may be able to operate with a lesser number of LEDs and still provide sufficient resolution/precision, and indeed so may larger versions. However, generally, it is thought that the larger the size of the LED ring unit 600, the greater the number of LEDs will be contained in its LED ring 660.

Another important point to be made is that, regardless of the total number of LEDs, in the embodiment of the invention presently described, not all of the LEDs that together make up the LED ring 660 are the same colour. On the contrary, the LED ring will include LEDs which are operable to generate light of different colours. In the particular embodiment described, there will be LEDs that are operable to generate green, yellow and red light, and LEDs of all three of these different types (colours) will be located (spread) evenly around the circumference of the LED ring so that it is possible for light of any one of these three colours to be emitted from effectively anywhere around the LED ring 660.

The way in which the presently-described embodiment of the invention can be used in operation to help monitor the orientation of an auger during a drilling operation, and to allow correction should the auger deviate, will now be explained.

Firstly, the way in which the inclinometer unit 500 operates during operation to continually measure/detect and provide signals indicative of the orientation of the auger has been explained previously and will not be repeated. These signals are (in this embodiment) then supplied to control electronics (not shown). The control electronics could be housed within or nearby the inclinometer unit 500, or within or nearby the LED ring unit 600, or possibly within some other separate housing/unit located in, on, or somewhere nearby the auger drive unit 400. In any case, the control electronics receive the signals from the inclinometer unit 500 and use these to provide control signals to control the operation of the LED ring unit (and in particular control the way in which LEDs within the LED ring unit are illuminated). More specifically, the control electronics will provide control signals to the LED ring unit 600 (either via a cable, or wirelessly) in the said control signals will be operable to cause the LED ring unit (and in particular the LEDs therein) to operate in the manner discussed below.

Without limitation to what is said in the previous paragraph, it is envisaged that, often, the control electronics will be housed in a housing which may be referred to as a "junction box". Thus, this junction box may contain all electronics required in order to receive the signals produced by the inclinometer unit 500, perform any necessary calculations, computations or other signal processing, and provide appropriate control signals to appropriately control the operation of the LED ring unit 600. It is further envisaged that, this junction box will often be mounted somewhere on the excavator, typically somewhere near the end of the excavator boom. The electronics (the control electronics) contained inside the junction box will typically be powered by power drawn from the excavator's electrical systems. By way of example, a cable carrying power (e.g. 12 V or 24 V) may be provided which is "hardwired" into the excavator electrics, or possibly this cable may be a separate/removable cable that is e.g. plugged into the excavator's cigarette lighter socket. In any case, this is how the power that powers the control electronics may be provided.

Furthermore, whilst it is possible for at least some of the signaling required in various embodiments of the invention to be achieved wirelessly, in other embodiments all signal transmissions between e.g. the inclinometer unit 500, the junction box (not shown) and the LED ring unit 600 may be transmitted over cables. Hence, all of these may be connected by electrical cables, and these cables (as well as carrying signals/information) may also carry the electrical power required to operate the various components.

Figure 10:
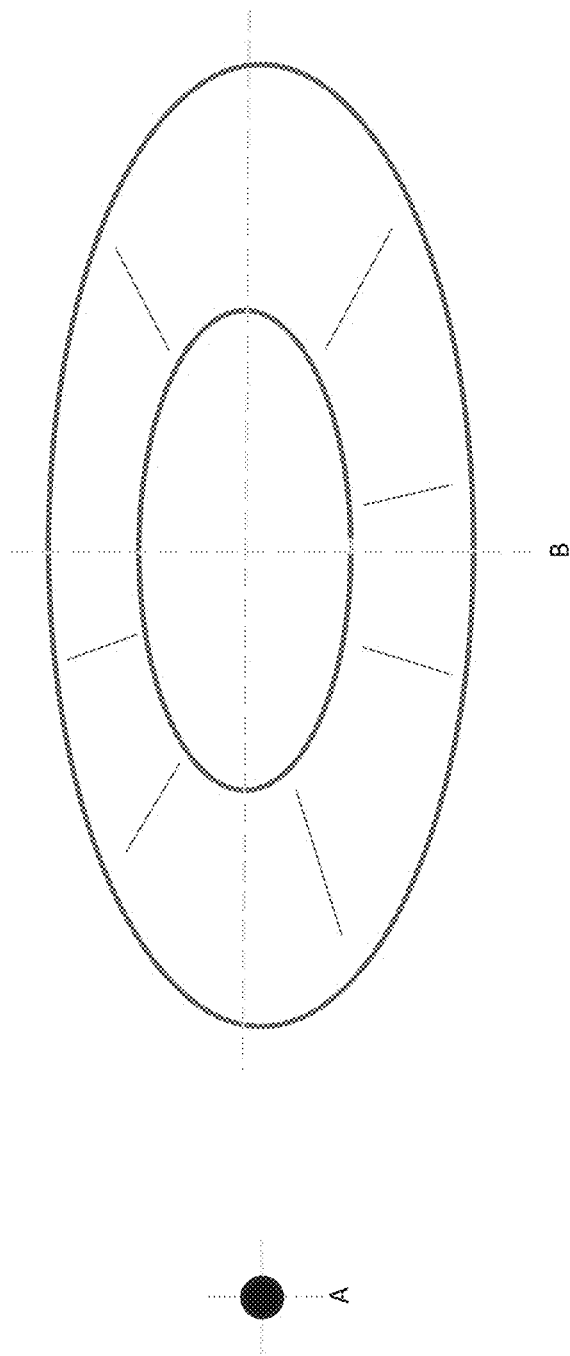
FIG. 10 contains two views, namely view A (FIG. 10A) and view B (FIG. 10B).

During a hole drilling operation (and assuming the hole being drilled is intended to be oriented perfectly vertically), whenever the inclinometer unit 500 senses that the auger is perfectly plum as desired (within the tolerance range determined by the sensitivity of the inclinometer unit 500, which can be adjusted), the control electronics will generate signals that cause only the green LEDs spaced around the LED ring to become illuminated. The effect of this is that, from the point of view of an observer nearby (e.g. the excavator operator, or an observer standing on any side of the auger), it will appear as if the whole LED ring is illuminated green. More specifically, whenever the inclinometer unit 500 senses that the auger is perfectly plum, the control electronics will generate signals that cause the green LEDs (only) to become illuminated in a "solidly-on" or "all-constantly-on" or "whole-ring-not-flashing" manner. This is represented schematically in FIG. 10. More specifically, FIG. 10A is a schematic (planform) representation of the stem of an auger when the auger is perfectly plum (i.e. oriented perfectly vertically), and FIG. 10B is a schematic representation of green light (only) being illuminated in all directions by the LED ring in a "solid"/"non-flashing" manner.

However, when the inclinometer unit 500 senses that the auger is not plum (i.e. whenever it is sensed that the auger has tilted by an amount that is greater than the minimum tolerance—this minimum tolerance being determined by the (adjustable) sensitivity of the inclinometer unit 500), the way the LED ring unit is illuminated immediately changes. Basically, what happens is that, whenever the auger is detected not to be plum, the LEDs in two diagonally-opposing quadrants of the LED ring 660 will become illuminated (in a manner discussed below), but the LEDs in the other two diagonally-opposing quadrants will simply turn off.

In relation to the two diametrically opposing quadrants that are illuminated when the auger is not plum, in one of these quadrants all of the LEDs will be "constantly-on"/"solid", whereas all of the LEDs in the other opposing quadrant will flash (i.e. they will all flash together, and the amount of time that they remain on, and off, to thereby create the "flashing" effect, will be such that the flashing can be easily observed and recognised by the human eye—in other words the flashing will not be so fast as to be unrecognisable as flashing to the human eye, and nor will it be so slow that a human might accidentally mistake flashing LEDs for LEDs that are "solid" or "constantly-on").

Figure 11:
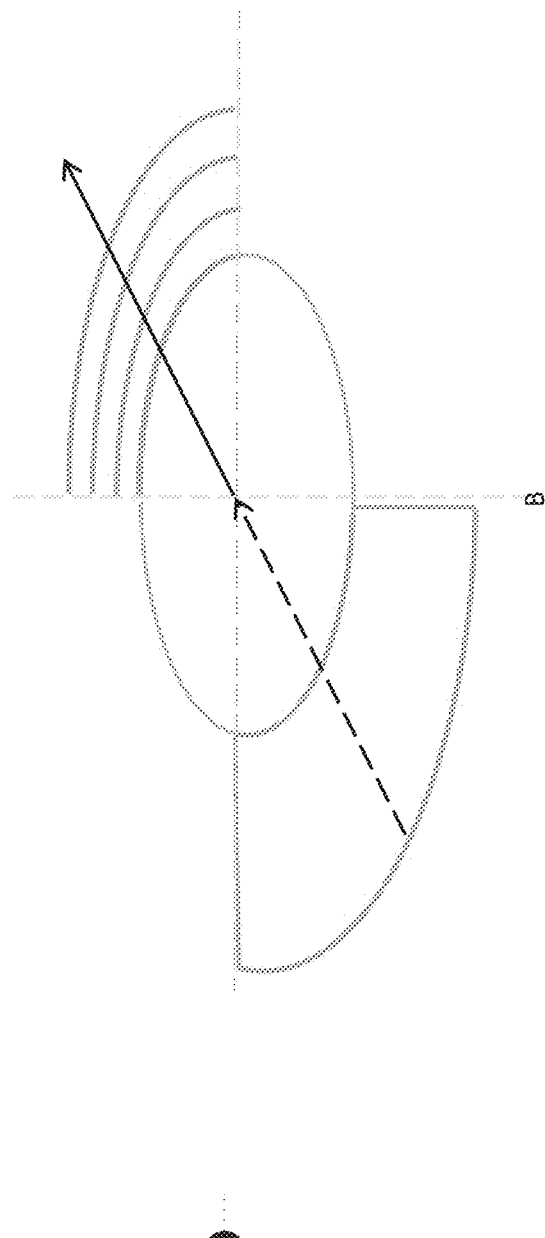
FIG. 11 contains two views, namely view A (FIG. 11A) and view B (FIG. 11B).

As shown in FIG. 11, the flashing quadrant (or from the point of view of an observer, the "side" or "region" of the LED ring unit that can be seen to be flashing) indicates the direction in which a correction needs to be made to bring the auger back to plum. More specifically, in FIG. 11, the small arrow shown in FIG. 11A indicates the direction of a (relatively small) detected tilt/deviation of the auger, and FIG. 11B indicates the way in which the LED ring (or the relevant quadrants of it) are illuminated in order to indicate the direction of the required correction to bring the auger back to plumb. More specifically, the fact that it is the particular LEDs in the quadrant shown flashing in FIG. 11B indicates to the excavator operator (or an observer) that the direction in which a correction needs to be made, to bring the auger back to plum, is the direction represented by the solid arrow in FIG. 11B. Note that, in practice/reality, an excavator operator (or observer) will not actually see anything equivalent to the solid arrow in FIG. 11B to indicate the exact direction of the required correction, however it is nevertheless possible for the excavator operator (or observer) to know that actual direction in which a correction is required as this will always be the direction in the centre (i.e. the direction extending radially out through the middle) of the arc created by LEDs in the "flashing" quadrant.

Another important point to note, however, is that in some cases the quadrant of LEDs that is flashing may actually be on the opposite side of the auger drive unit from the excavator operator (or from an observer). Therefore, where this is the case, the excavator operator will not actually be able to see the flashing LEDs. However, in this situation, the excavator operator will still be able to see (at least some of) the LEDs in the diagonally-opposing quadrant which are all "solidly-on". The excavator operator will therefore know (even though he cannot see the flashing LEDs) the direction in which a correction needs to be made, because this will be the direction indicated by the dashed arrow in FIG. 11B. Therefore, if the operator is sitting in the cab of the excavator and he/she can only see one quadrant (or a portion of one quadrant) that is illuminated "solidly" but not flashing, this is nevertheless sufficient to indicate to the operator that the direction extending through the centre of the diagonally opposing quadrant (which is out of the operator's view) is the direction in which a correction needs to be made. Thus, the operator can nevertheless know the direction in which a correction is required.

Figure 12:
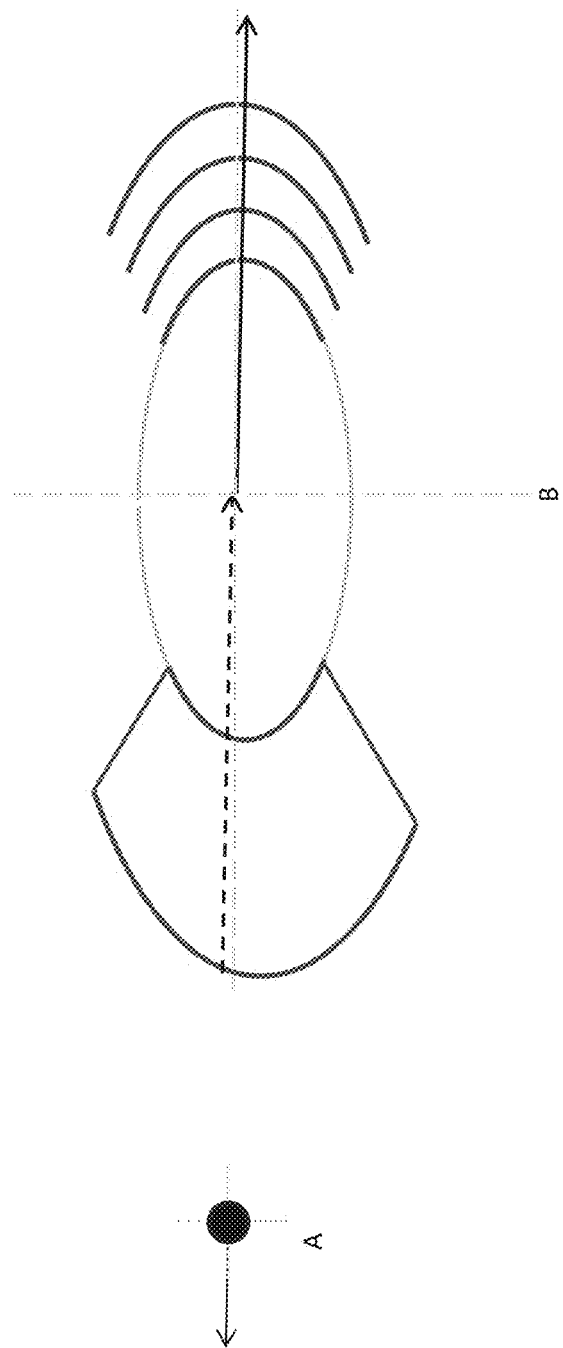
FIG. 12 contains two views, namely view A (FIG. 12A) and view B (FIG. 12B).

An important point to note is that the LED ring unit doesn't simply have four "fixed" quadrants that can be illuminated as described above. Rather, as mentioned above, LEDs of all three different colour types are spaced evenly around the circumference of the LED ring unit, and consequently opposing quarter-arcs containing the respective "solidly-illuminated" and "flashing" quadrants can be oriented in any direction, subject only to the "resolution" which is determined by the number of LEDs in the LED ring. In other words, the higher the number of total LEDs in the LED ring, the higher the "resolution", and therefore the more precisely the locations of the respective opposing "solidly-illuminated" and "flashing" quadrants can be made on the LED ring unit 600 to indicate the direction of the required correction. FIG. 12 provides an example of a situation in which the direction of the required correction, as indicated by the respectively "solidly-illuminated" and "flashing quadrants", is different to the direction of the correction represented in FIG. 11. Note also that, in FIG. 12 (unlike FIG. 11), the positioning the respective opposed quadrants does not correspond with the quadrants defined by the reference axes shown in grey dashed lines. This is therefore intended to illustrate, by way of example, the way that the respective "solidly-illuminated" and "flashing" quadrants can be oriented in any direction, subject only to the "resolution" (which is determined by the number of LEDs).

It was mentioned above that LEDs operable to emit differently coloured light (specifically, green, yellow and red) are included in the LED ring 660. The purpose of the differently coloured LEDs, and the consequent ability of the LED ring unit to illuminate different quadrants (or indeed the whole ring) in different colours, is so that, in the event that the auger is sensed to have tilted/deviated from plum, different colours can provide an indication of the extent or severity of the tilt/deviation (i.e. how far the auger has deviated from plum). As mentioned above, when the auger is sensed to be perfectly plum, all of the green LEDs around the whole circumference of the LED ring unit will be illuminated in a "solidly-on" or "all-constantly-on" or "whole-ring-not-flashing" manner. Hence, when solid green light is emitted from the hole LED ring, this indicates to the operator (observer) that the auger is plumb.

However, in situations where the auger is determined to have tilted/deviated, but by only a relatively small amount, it will be only the yellow LEDs that illuminate. More specifically, as shown in FIG. 11B, the yellow LEDs in the quadrant corresponding to the direction in which a correction needs to be made will flash, and the LEDs in the diagonally opposite quadrant will be "solidly on". The LED ring unit will continue to be illuminated in this way while (or for as long as) the extent and direction of the tilt/deviation of the auger remains the same. If the auger moves back to plum, the LED ring unit will again become illuminated "solidly green" as shown in FIG. 10. Alternatively, if the extent of the auger's tilt/deviation remains approximately the same (relatively small) but the direction of the tilt/deviation changes, then the respective quadrants may continue to be illuminated in (flashing and solid respectively) yellow, similar to FIG. 11B, except that the orientation of the quadrants will change relative to that shown in FIG. 11B to reflect the changed direction of the tilt/deviation of the auger. In the event that the extent of the tilt/deviation of the auger becomes worse or sufficiently severe, the yellow LEDs will turn off in the direction of required correction will immediately begin to be indicated by red LEDs. Hence, when the direction of required correction is indicated in yellow light, this indicates to the excavator operator (and any observer) that the extent of the auger tilt/deviation requiring correction is relatively small. However, when the direction of required correction as indicated in red light, this indicates to the excavator operator (and any observer) that the extent of the auger tilt/deviation requiring correction is larger or more severe. The excavator operator can therefore use this information to help inform the size of the correction that is made in response to indications of auger deviation provided the from the LED ring unit (i.e. in the manner discussed above).

In some embodiments, a greater number of different colours of LEDs may be provided. For example, rather than providing only green, yellow and red LEDs, in other embodiments orange LEDs might also be provided, and these may be used to indicate the direction of required correction in circumstances where the extent of the auger's tilt/deviation is greater than would be indicated by yellow light, but less than or the indicated by red light.

It was mentioned above that the sensitivity of the inclinometer unit 500 can be (or may be able to) adjusted. Adjusting the sensitivity of the inclinometer serves to change the amount/extent by which the auger must tilt/deviate from plum before this is registered as (or determined to be) a deviation. The reason why it may be important or useful to provide the capability to adjust the inclinometer unit's sensitivity is because, often, larger machines (e.g. large excavators operating very large augers) will require a greater inclinometer sensitivity than smaller machines (e.g. small excavators operating comparatively much smaller augers). The reason for this may be explained in simple terms as follows. If one is operating a small excavator and a small auger to drill or a relatively small diameter hole, if the auger alignment system being used is repeatedly or constantly indicating to the operator that the auger is "off-plum" this might suggest to the operator that the hole being drilled is constantly off vertical, and it may therefore be assumed that virtually all sections of the hole that have been drilled have been off-vertical (and that the operation has therefore gone poorly), when in reality most or all of the hole may actually be vertical (or acceptably close to vertical). Therefore, where small machines are used in such it situations, it is often desirable for the inclinometer sensitivity to be lower (i.e. made less sensitive), so that less false or unwanted indications of auger tilt/deviation are provided. In contrast, when operating much larger machines (e.g. a much larger excavator using a very large auger to drill a wide or deep hole), small deviations of the auger can potentially result in much more significant off-path deviations of the hole or other problems, and therefore it may be desirable for the sensitivity of the inclinometer to be higher. (With these larger machines, it may often also be the case that it takes much more to cause even a small deviation of the auger, but also that corrections are also correspondingly more difficult. Hence, a higher inclinometer sensitivity may also be desirable for this reason). By way of indication, a comparatively high sensitivity (e.g. suitable for use with large augers and the like) could be a sensitivity of approximately ±0.5° to 1.0°. In contrast, a comparatively low sensitivity (e.g. suitable for use with smaller augers and the like) might be approximately ±20 to 3°. It is possible that, in embodiments of the present invention, means may be provided for adjusting the sensitivity of the inclinometer. In addition, or alternatively, it may be that the inclinometer sensitivity differs according to the size of the e.g. LED ring unit 600, given that larger LED ring unit 600 will tend to be designed and intended for use on larger auger drive units, and hence larger augers.

It has been found in trials conducted by the present inventor that an operator of the implement quickly becomes very used to correcting the orientation of the implement by moving the implement towards the flashing lights, or moving the implement away from the solid lights. Further, as opposed indicating portions light up when the implement is out of the desired orientation, the risk that both indicating portions will be obscured from the view of the operator is almost completely obviated. If alternative indicating patterns in the first indicating portion and the second indicating portion are used, the operator will again become very quickly used to making appropriate correction in light of those indicating patterns.

The present invention also does not require a screen or a monitor to be placed in the cabin of the vehicle to which the implement is attached. This simplifies installation and reduces cost.

In some embodiments, the present invention has an orientation indicator in the form of an illumination device or a plurality of illumination devices that extend substantially around or completely around the implement or the drive unit or gearbox for the implement. In these embodiments, the illumination device(s) may be arranged such that when the implement is in the correct orientation, the illumination device(s) are lit. As the orientation indicator extends around the implement the drive unit or gearbox for the implement, an operator in the cabin of the vehicle to which the implement is attached can easily see the orientation indicator. If the illumination device(s) go out, the operator will know that the implement is away from the desired orientation and can take corrective action to correct the orientation of the implement. In other embodiments, the orientation indicator of this form of the invention may operate as described with reference to the embodiment shown in the attached drawings.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. An apparatus for use in maintaining a desired orientation of an implement for forming holes, the apparatus comprising:
orientation sensing equipment operable to sense the orientation of the implement; and
an orientation indicator operable to be mounted to the implement or to a drive unit or a gearbox for the implement, the orientation indicator comprising a plurality of illumination devices extending substantially around the implement or extending substantially around the drive unit or gearbox for the implement;
the orientation indicator having a plurality of indicating portions, and when the orientation indicator is mounted relative to the implement, the indicating portions are positioned so as to be visible from different locations around the implement;
wherein the plurality of indicating portions include a first indicating portion, and a second indicating portion located generally opposite to the first indicating portion;
wherein the illumination devices in an array are arranged relative to one another to form a line of illumination devices defining a closed shape corresponding to and extending around a perimeter of an outer housing of an implement rotation drive unit, and
the illumination devices forming a first portion of the array, and the illumination devices forming a second portion of the array are not fixed, and depending on which direction the orientation of the implement has deviated, different ones of the illumination devices form part of either one or the other of the first and second portions of the array;
wherein, in use, when the orientation of the implement deviates from a desired orientation, at least the first indicating portion and the second indicating portion illuminate to provide a visible indication of a direction in which the implement has deviated from the desired orientation, and
wherein the first indicating portion illuminates in a first manner and the second indicating portion illuminates in a second manner when orientation of the implement deviates from the desired orientation.

2. The apparatus as claimed in claim 1, wherein the plurality of illumination devices extending substantially around the drive unit or the gear box define a circle corresponding to, and extending around a circular perimeter of a cylindrical outer housing of the implement rotation drive unit.

3. The apparatus as claimed in claim 1, wherein the plurality of illumination devices comprises a plurality of lightbulbs or a plurality of light emitting diodes.

4. The apparatus as claimed in claim 1, wherein the plurality of illumination devices are arranged in a ring.

5. The apparatus as claimed in claim 1, wherein the orientation indicator fully illuminates when the implement is in a correct orientation or within a predetermined margin of a correct orientation.

6. The apparatus as claimed in claim 1, wherein the implement is a rotating tool or device which is attached for operation to an implement rotation drive unit, or to the implement for forming holes.

7. The apparatus as claimed in claim 6, wherein the orientation indicator becomes mounted relative to the implement by being mounting to, or relative to, the implement rotation drive unit.

8. The apparatus as claimed in claim 6, wherein the orientation sensing equipment includes a portion that is operable to be mounted to, or relative to, the implement rotation drive unit, and the orientation sensing equipment is operable, when so mounted and in use, to sense the orientation of the implement by sensing the orientation of the implement rotation drive unit and relating this to the orientation of the implement.

9. The apparatus as claimed in claim 1, wherein, in use, the orientation sensing equipment is operable to continuously sense the orientation of the implement, and in use the orientation sensing equipment is also operable, at least when the orientation of the implement deviates from the desired, to generate signals indicative of the orientation of the implement, and the signals are transmitted to the orientation indicator.

10. The apparatus as claimed in claim 9, wherein, in use, when the orientation of the implement deviates from the desired orientation, signals generated by the orientation sensing equipment cause the first array of indicators and the second array of indicators of the orientation indicator to provide a visible indication of a direction in which the implement has deviated from the desired orientation.

11. The apparatus as claimed in claim 1, wherein the implement rotation drive unit has an outer housing, and the orientation indicator is operable to be mounted to, or relative to, the outer housing, and when so mounted the plurality of indicating portions of the orientation indicator become positioned at spaced locations around the outer housing.

12. The apparatus as claimed in claim 11, wherein the outer housing of the implement rotation drive unit is substantially cylindrical with a principal axis corresponding to the axis of rotation of the implement, and when the orientation indicator is mounted to, or relative to, the outer housing, the first and second indicating portions become positioned around the perimeter of the outer housing in a plane generally perpendicular to the principal axis of the outer housing.

13. The apparatus as claimed in claim 1, wherein an array of light-emitting elements is provided, and wherein individual light-emitting elements in the array are arranged relative to one another to form athe line of light-emitting elements defining athe closed shape corresponding to, and extending around, the perimeter of the outer housing of the implement rotation drive unit.

14. The apparatus as claimed in claim 13, wherein an array of light-emitting elements is provided, wherein the individual light-emitting elements in the array are arranged relative to one another to form a line of light-emitting elements defining a circle corresponding to, and extending around, the circular perimeter of the cylindrical outer housing of the implement rotation drive unit.

15. The apparatus as claimed in claim 13, wherein the length of a first perimeter portion of the outer housing, along or around which the first portion of the array extends, is less than half the perimeter length, and a length of the second perimeter portion of the outer housing, along or around which the second portion of the array extends, is less than half the perimeter length.

16. The apparatus as claimed in claim 15, wherein the length of the first perimeter portion of the outer housing, along or around which the first portion of the array extends, is between about one third and about one sixth of the perimeter length, and the length of the second perimeter portion of the outer housing, along or around which the second portion of the array extends, is between about one third and about one sixth of the perimeter length.

17. The apparatus as claimed in claim 13, wherein the plurality of light-emitting elements includes light-emitting elements which are operable, when illuminated, to emit light of at least two different wavelengths/colours.

18. The apparatus as claimed in claim 13, wherein the plurality of light-emitting elements includes light-emitting elements which are operable, when illuminated, to emit light of at least two different wavelengths/colours, and wherein, in use, when the orientation of the implement deviates from the desired orientation, the one or more light-emitting elements forming the first portion of the array illuminate(s) in a first colour; and the one or more light-emitting elements forming the second portion of the array illuminate(s) in a second colour.

19. The apparatus as claimed in claim 13, wherein, in use, when the orientation of the implement deviates from the desired orientation, the one or more light-emitting elements forming the first portion of the array illuminate(s) in a flashing or blinking manner; and the one or more light-emitting elements forming the second portion of the array illuminate(s) in a "solid" or "constantly-on" or "non-flashing/non-blinking" manner.

20. The apparatus as claimed in claim 13, wherein, in use, when the orientation of the implement deviates from the desired orientation, one or more light-emitting elements forming the first portion of the array illuminate(s) in a flashing or blinking manner;

one or more light-emitting elements forming the second portion of the array illuminate(s) in a "solid" or "constantly-on" or "non-flashing/non-blinking" manner; and the colour of the light emitted by certain light-emitting element(s) indicates the extent to which the orientation of the implement has deviated from the desired orientation.

21. The apparatus as claimed in claim 20, wherein in use, when the orientation of the implement deviates from the desired orientation the colour of the light emitted by the light-emitting elements in the first portion of the array will be the same as the colour of the light emitted by the light-emitting elements in the second portion of the array, and the colour indicates the extent to which the orientation of the implement has deviated from the desired orientation.

22. A method for maintaining a desired orientation of an implement, comprising:

providing an orientation indicator as claimed in claim 1;

mounting the orientation indicator relative to the implement;

operating the orientation sensing equipment and the orientation indicator while the implement is in use such that, when the orientation of the implement deviates from the desired orientation, at least the first indicating portion and the second indicating portion provide a visible indication of a direction in which the implement has deviated from the desired orientation by the one or more illumination devices of the first indicating portion and the second indicating portion illuminating;

and wherein the one or more illumination devices of the first indicating portion illuminate in a first manner and the one or more illumination devices of the second indicating portion illuminate in a second manner when orientation of the implement deviates from the desired orientation; and correcting the orientation of the implement by moving the implement towards the first indicating portion.

* * * * *